(12) United States Patent
Visco et al.

(10) Patent No.: US 9,362,538 B2
(45) Date of Patent: *Jun. 7, 2016

(54) ADVANCED LITHIUM ION BATTERIES BASED ON SOLID STATE PROTECTED LITHIUM ELECTRODES

(71) Applicant: PolyPlus Battery Company, Berkeley, CA (US)

(72) Inventors: Steven J. Visco, Berkeley, CA (US); Yevgeniy S. Nimon, Danville, CA (US); Bruce D. Katz, Moraga, CA (US)

(73) Assignee: PolyPlus Battery Company, Berkeley, CA (US)

( * ) Notice: Subject to any disclaimer, the term of this patent is extended or adjusted under 35 U.S.C. 154(b) by 98 days.

This patent is subject to a terminal disclaimer.

(21) Appl. No.: 14/292,699

(22) Filed: May 30, 2014

(65) Prior Publication Data

US 2014/0272524 A1 Sep. 18, 2014

Related U.S. Application Data

(63) Continuation of application No. 13/708,540, filed on Dec. 7, 2012, now Pat. No. 8,778,522, which is a continuation of application No. 13/336,459, filed on Dec. 23, 2011, now abandoned, which is a (Continued)

(51) Int. Cl.
*H01M 2/14* (2006.01)
*H01M 2/16* (2006.01)
(Continued)

(52) U.S. Cl.
CPC ............... *H01M 2/145* (2013.01); *H01M 2/16* (2013.01); *H01M 2/1673* (2013.01); *H01M 6/187* (2013.01); *H01M 10/056* (2013.01); *H01M 10/0525* (2013.01); *H01M 10/0562* (2013.01);
(Continued)

(58) Field of Classification Search
None
See application file for complete search history.

(56) References Cited

U.S. PATENT DOCUMENTS 3,528,856 A 9/1970 Ovshinsky
3,607,417 A 9/1971 McRae et al.
(Continued)

FOREIGN PATENT DOCUMENTS

EP 0111213 11/1983
EP 0111214 11/1983
(Continued)

OTHER PUBLICATIONS

U.S. Appl. No. 13/464,835, Office Action mailed Jun. 3, 2014.
(Continued)

*Primary Examiner* — Gregg Cantelmo
(74) *Attorney, Agent, or Firm* — Weaver Austin Villeneuve & Sampson LLP

(57) ABSTRACT

Disclosed are ionically conductive membranes for protection of active metal anodes and methods for their fabrication. The membranes may be incorporated in active metal negative electrode (anode) structures and battery cells. In accordance with the invention, the membrane has the desired properties of high overall ionic conductivity and chemical stability towards the anode, the cathode and ambient conditions encountered in battery manufacturing. The membrane is capable of protecting an active metal anode from deleterious reaction with other battery components or ambient conditions while providing a high level of ionic conductivity to facilitate manufacture and/or enhance performance of a battery cell in which the membrane is incorporated.

36 Claims, 11 Drawing Sheets

Related U.S. Application Data continuation of application No. 12/907,819, filed on Oct. 19, 2010, now Pat. No. 8,114,171, which is a continuation of application No. 12/475,403, filed on May 29, 2009, now Pat. No. 7,838,144, which is a continuation of application No. 11/824,574, filed on Jun. 29, 2007, now abandoned, which is a continuation of application No. 10/772,228, filed on Feb. 3, 2004, now Pat. No. 7,390,591, which is a continuation-in-part of application No. 10/731,771, filed on Dec. 5, 2003, now Pat. No. 7,282,302, which is a continuation-in-part of application No. 10/686,189, filed on Oct. 14, 2003, now Pat. No. 7,282,296.

(60) Provisional application No. 60/418,899, filed on Oct. 15, 2002, provisional application No. 60/511,710, filed on Oct. 14, 2003, provisional application No. 60/518,948, filed on Nov. 10, 2003.

(51) Int. Cl.
*H01M 6/18* (2006.01)
*H01M 10/0525* (2010.01)
*H01M 10/056* (2010.01)
*H01M 10/0562* (2010.01)
*H01M 10/0565* (2010.01)

(52) U.S. Cl.
CPC .......... *H01M 10/0565* (2013.01); *H01M 6/181* (2013.01); *H01M 6/182* (2013.01); *H01M 6/185* (2013.01); *H01M 6/188* (2013.01); *H01M 2300/008* (2013.01); *H01M 2300/0065* (2013.01); *H01M 2300/0071* (2013.01); *H01M 2300/0094* (2013.01); *Y02E 60/122* (2013.01); *Y02P 70/54* (2015.11); *Y10T 29/49108* (2015.01); *Y10T 29/49115* (2015.01)

(56) References Cited

U.S. PATENT DOCUMENTS

| | | |
|---|---|---|
| 3,615,835 A | 10/1971 | Ovshinsky |
| 3,625,769 A | 12/1971 | Lyall |
| 3,679,540 A | 7/1972 | Zimmerman et al. |
| 3,703,415 A | 11/1972 | Mitoff et al. |
| 3,912,536 A | 10/1975 | Galli et al. |
| 3,953,566 A | 4/1976 | Gore |
| 3,976,509 A | 8/1976 | Tsai et al. |
| 4,007,057 A | 2/1977 | Littauer et al. |
| 4,091,182 A | 5/1978 | Farrington et al. |
| 4,100,238 A | 7/1978 | Shinomura |
| 4,162,202 A | 7/1979 | Dey |
| 4,163,084 A | 7/1979 | Tsai et al. |
| 4,187,390 A | 2/1980 | Gore |
| 4,210,707 A | 7/1980 | Farrington |
| 4,385,101 A | 5/1983 | Catanzarite |
| 4,402,995 A | 9/1983 | Fleischer |
| 4,405,416 A | 9/1983 | Raistrick et al. |
| 4,414,293 A | 11/1983 | Joy et al. |
| 4,429,000 A | 1/1984 | Naka et al. |
| 4,504,561 A | 3/1985 | Winsel |
| 4,539,256 A | 9/1985 | Shipman |
| 4,726,989 A | 2/1988 | Mrozinski |
| 4,828,942 A | 5/1989 | Licht |
| 4,833,048 A | 5/1989 | De Jonghe et al. |
| 4,916,036 A | 4/1990 | Cheiky |
| 4,917,974 A | 4/1990 | Visco et al. |
| 4,981,672 A | 1/1991 | De Neufville et al. |
| 4,985,317 A | 1/1991 | Adachi et al. |
| 5,002,843 A | 3/1991 | Cieslak et al. |
| 5,035,963 A | 7/1991 | Plichta et al. |
| 5,100,523 A | 3/1992 | Helms et al. |
| 5,108,856 A | 4/1992 | Shuster |
| 5,162,172 A | 11/1992 | Kaun |
| 5,162,175 A | 11/1992 | De Jonghe et al. |
| 5,166,011 A | 11/1992 | Rao et al. |
| 5,198,081 A | 3/1993 | Kanoh et al. |
| 5,213,908 A | 5/1993 | Hagedorn |
| 5,290,592 A | 3/1994 | Izuchi et al. |
| 5,314,765 A | 5/1994 | Bates |
| 5,336,384 A | 8/1994 | Tsou et al. |
| 5,338,625 A | 8/1994 | Bates et al. |
| 5,342,710 A | 8/1994 | Koksbang |
| 5,387,479 A | 2/1995 | Koksbang |
| 5,409,786 A | 4/1995 | Bailey |
| 5,413,881 A | 5/1995 | Licht et al. |
| 5,427,873 A | 6/1995 | Shuster |
| 5,455,126 A | 10/1995 | Bates et al. |
| 5,506,068 A | 4/1996 | Dan et al. |
| 5,510,209 A | 4/1996 | Abraham et al. |
| 5,512,147 A | 4/1996 | Bates et al. |
| 5,516,598 A | 5/1996 | Chu et al. |
| 5,523,179 A | 6/1996 | Chu |
| 5,525,442 A | 6/1996 | Shuster |
| 5,532,077 A | 7/1996 | Chu |
| 5,567,210 A | 10/1996 | Bates et al. |
| 5,569,520 A | 10/1996 | Bates |
| 5,571,600 A | 11/1996 | Licht |
| 5,582,623 A | 12/1996 | Chu |
| 5,597,660 A | 1/1997 | Bates et al. |
| 5,612,152 A | 3/1997 | Bates |
| 5,648,183 A | 7/1997 | Licht et al. |
| 5,648,187 A | 7/1997 | Skotheim |
| 5,652,068 A | 7/1997 | Shuster et al. |
| 5,665,481 A | 9/1997 | Shuster et al. |
| 5,686,201 A | 11/1997 | Chu |
| 5,693,212 A | 12/1997 | Mazanec et al. |
| 5,702,995 A | 12/1997 | Fu |
| 5,789,108 A | 8/1998 | Chu |
| 5,814,420 A | 9/1998 | Chu |
| 5,882,812 A | 3/1999 | De Jonghe et al. |
| 5,961,672 A | 10/1999 | Skotheim et al. |
| 5,962,171 A | 10/1999 | Boguslavsky et al. |
| 6,017,651 A | 1/2000 | Chu et al. |
| 6,025,094 A | 2/2000 | Visco et al. |
| 6,025,095 A | 2/2000 | Kawamura |
| 6,030,720 A | 2/2000 | Chu et al. |
| 6,030,909 A | 2/2000 | Fu |
| 6,066,417 A | 5/2000 | Cho et al. |
| 6,068,950 A | 5/2000 | Gan et al. |
| 6,096,447 A | 8/2000 | Gan et al. |
| 6,110,236 A | 8/2000 | Chu et al. |
| 6,146,787 A | 11/2000 | Harrup et al. |
| 6,165,644 A | 12/2000 | Chu et al. |
| 6,183,901 B1 | 2/2001 | Ying et al. |
| 6,198,701 B1 | 3/2001 | De Jonghe et al. |
| 6,200,701 B1 | 3/2001 | Gan et al. |
| 6,200,704 B1 | 3/2001 | De Jonghe et al. |
| 6,203,942 B1 | 3/2001 | Gan et al. |
| 6,203,947 B1 | 3/2001 | Peled et al. |
| 6,207,324 B1 | 3/2001 | Licht |
| 6,210,832 B1 | 4/2001 | Chu et al. |
| 6,214,061 B1 | 4/2001 | Visco et al. |
| 6,225,002 B1 | 5/2001 | Chu et al. |
| 6,228,527 B1 | 5/2001 | Medeiros et al. |
| 6,242,135 B1 | 6/2001 | Mushiake |
| 6,248,481 B1 | 6/2001 | Visco et al. |
| 6,274,269 B1 | 8/2001 | Gan et al. |
| 6,280,598 B1 | 8/2001 | Barton et al. |
| 6,296,958 B1 | 10/2001 | Pinto et al. |
| 6,315,881 B1 | 11/2001 | Fu |
| 6,358,643 B1 | 3/2002 | Katz et al. |
| 6,358,651 B1 | 3/2002 | Chen et al. |
| 6,376,123 B1 | 4/2002 | Chu |
| 6,391,492 B1 | 5/2002 | Kawakami et al. |
| 6,402,795 B1 | 6/2002 | Chu et al. |
| 6,413,284 B1 | 7/2002 | Chu et al. |
| 6,413,285 B1 | 7/2002 | Chu et al. |
| 6,432,584 B1 | 8/2002 | Visco et al. |
| 6,475,677 B1 | 11/2002 | Inda et al. |
| 6,485,622 B1 | 11/2002 | Fu |
| 6,489,055 B1 | 12/2002 | Ichihashi et al. |
| 6,495,285 B2 | 12/2002 | Gan et al. |

(56) References Cited

U.S. PATENT DOCUMENTS

| | | |
|---|---|---|
| 6,511,772 B2 | 1/2003 | Gan et al. |
| 6,537,698 B2 | 3/2003 | Gan et al. |
| 6,537,701 B1 | 3/2003 | Chu et al. |
| 6,632,573 B1 | 10/2003 | Nimon et al. |
| 6,723,140 B2 | 4/2004 | Chu et al. |
| 6,733,924 B1 | 5/2004 | Skotheim et al. |
| 6,737,197 B2 | 5/2004 | Chu et al. |
| 6,766,817 B2 | 7/2004 | Da Silva |
| 6,770,187 B1 | 8/2004 | Putter et al. |
| 6,797,428 B1 | 9/2004 | Skotheim et al. |
| 6,835,492 B2 | 12/2004 | Cho et al. |
| 6,911,280 B1 | 6/2005 | De Jonghe et al. |
| 6,955,866 B2 | 10/2005 | Nimon et al. |
| 6,991,662 B2 | 1/2006 | Visco et al. |
| 7,070,632 B1 | 7/2006 | Visco et al. |
| 7,211,351 B2 | 5/2007 | Klaassen |
| 7,211,532 B2 | 5/2007 | Fu |
| 7,247,408 B2 | 7/2007 | Skotheim |
| 7,282,295 B2 | 10/2007 | Visco et al. |
| 7,282,296 B2 | 10/2007 | Visco et al. |
| 7,282,302 B2 | 10/2007 | Visco et al. |
| 7,344,804 B2 | 3/2008 | Klaassen |
| 7,390,591 B2 | 6/2008 | Visco et al. |
| 7,432,017 B2 | 10/2008 | Visco et al. |
| 7,491,458 B2 | 2/2009 | Visco et al. |
| 7,608,178 B2 | 10/2009 | De Jonghe et al. |
| 7,645,543 B2 | 1/2010 | Visco et al. |
| 7,666,233 B2 | 2/2010 | Visco et al. |
| 7,771,870 B2 | 8/2010 | Affinito et al. |
| 7,781,108 B2 | 8/2010 | Visco et al. |
| 7,829,212 B2 | 11/2010 | Visco et al. |
| 7,838,144 B2 | 11/2010 | Visco et al. |
| 7,858,223 B2 | 12/2010 | Visco et al. |
| 7,998,626 B2 | 8/2011 | Visco et al. |
| 8,048,571 B2 | 11/2011 | Visco et al. |
| 8,114,171 B2 | 2/2012 | Visco et al. |
| 8,182,943 B2 | 5/2012 | Visco et al. |
| 8,202,649 B2 | 6/2012 | Visco et al. |
| 8,323,820 B2 | 12/2012 | Visco et al. |
| 8,334,075 B2 | 12/2012 | Visco et al. |
| 8,389,147 B2 | 3/2013 | Visco et al. |
| 8,501,351 B2 | 8/2013 | Phillips et al. |
| 8,652,686 B2 | 2/2014 | Visco et al. |
| 8,652,692 B2 | 2/2014 | Visco et al. |
| 8,709,679 B2 | 4/2014 | Visco et al. |
| 8,828,580 B2 | 9/2014 | Visco et al. |
| 9,123,941 B2 | 9/2015 | Visco et al. |
| 2001/0014420 A1 | 8/2001 | Takeuchi et al. |
| 2001/0028977 A1 | 10/2001 | Kazacos et al. |
| 2001/0041294 A1 | 11/2001 | Chu et al. |
| 2002/0012845 A1 | 1/2002 | Choi et al. |
| 2002/0012846 A1 | 1/2002 | Skotheim et al. |
| 2002/0015869 A1 | 2/2002 | Suda |
| 2002/0028389 A1 | 3/2002 | Sonoda et al. |
| 2002/0034688 A1 | 3/2002 | Chu et al. |
| 2002/0068220 A1 | 6/2002 | Wyler et al. |
| 2002/0102465 A1 | 8/2002 | Chen et al. |
| 2002/0106563 A1 | 8/2002 | Okawa et al. |
| 2003/0124433 A1 | 7/2003 | Kim et al. |
| 2003/0190501 A1 | 10/2003 | Rendina |
| 2003/0224234 A1 | 12/2003 | Steele et al. |
| 2004/0081894 A1 | 4/2004 | Nimon |
| 2004/0101761 A1 | 5/2004 | Park et al. |
| 2004/0126653 A1 | 7/2004 | Visco et al. |
| 2004/0142244 A1 | 7/2004 | Visco et al. |
| 2004/0185334 A1 | 9/2004 | Iwamoto |
| 2004/0191617 A1 | 9/2004 | Visco et al. |
| 2004/0197641 A1 | 10/2004 | Visco et al. |
| 2005/0095506 A1 | 5/2005 | Klaassen |
| 2005/0100792 A1 | 5/2005 | Visco et al. |
| 2005/0100793 A1 | 5/2005 | De Jonghe et al. |
| 2005/0175894 A1 | 8/2005 | Visco et al. |
| 2005/0186469 A1 | 8/2005 | De Jonghe et al. |
| 2005/0208353 A1 | 9/2005 | Johnson |
| 2006/0046149 A1 | 3/2006 | Yong et al. |
| 2006/0063051 A1 | 3/2006 | Jang |
| 2006/0078790 A1 | 4/2006 | Nimon et al. |
| 2006/0183011 A1 | 8/2006 | Mittelsteadt et al. |
| 2007/0087269 A1 | 4/2007 | Inda |
| 2007/0117007 A1 | 5/2007 | Visco et al. |
| 2007/0117026 A1 | 5/2007 | Kumar et al. |
| 2007/0148533 A1 | 6/2007 | Anglin et al. |
| 2007/0172739 A1 | 7/2007 | Visco et al. |
| 2007/0231704 A1 | 10/2007 | Inda |
| 2008/0038641 A1 | 2/2008 | Visco et al. |
| 2008/0052898 A1 | 3/2008 | Visco et al. |
| 2008/0057386 A1 | 3/2008 | Visco et al. |
| 2008/0057387 A1 | 3/2008 | Visco et al. |
| 2008/0057399 A1 | 3/2008 | Visco et al. |
| 2009/0286114 A1 | 11/2009 | Visco et al. |
| 2009/0297935 A1 | 12/2009 | Visco et al. |
| 2010/0104934 A1 | 4/2010 | Visco et al. |
| 2010/0203383 A1 | 8/2010 | Weppner |
| 2011/0014522 A1 | 1/2011 | Visco et al. |
| 2011/0039144 A1 | 2/2011 | Visco et al. |
| 2011/0053002 A1 | 3/2011 | Yamamura et al. |
| 2011/0244337 A1 | 10/2011 | Ohta et al. |
| 2011/0269031 A1 | 11/2011 | Visco et al. |
| 2011/0318648 A1 | 12/2011 | Eitouni et al. |
| 2012/0009469 A1 | 1/2012 | Visco et al. |
| 2012/0094188 A1 | 4/2012 | Visco et al. |
| 2012/0169016 A1 | 7/2012 | Hisano et al. |
| 2012/0219842 A1 | 8/2012 | Visco et al. |
| 2013/0066025 A1 | 3/2013 | Yang et al. |
| 2013/0273419 A1 | 10/2013 | Pistorino et al. |
| 2014/0004447 A1 | 1/2014 | Visco et al. |
| 2014/0057153 A1 | 2/2014 | Visco et al. |
| 2014/0170465 A1 | 6/2014 | Visco et al. |
| 2015/0024251 A1 | 1/2015 | Visco et al. |
| 2015/0340720 A1 | 11/2015 | Visco et al. |
| 2016/0028063 A1 | 1/2016 | Visco et al. |

FOREIGN PATENT DOCUMENTS

| | | |
|---|---|---|
| EP | 0694501 | 1/1996 |
| EP | 0838441 | 4/1998 |
| EP | 0875951 | 11/1998 |
| EP | 0689260 | 4/1999 |
| EP | 1162675 | 12/2001 |
| EP | 1699104 | 9/2006 |
| EP | 1892780 | 2/2008 |
| JP | 55-081471 | 6/1980 |
| JP | 57-003371 | 1/1982 |
| JP | 57-017568 | 1/1982 |
| JP | 57-103271 | 6/1982 |
| JP | 62-243247 | 10/1987 |
| JP | 63-198261 | 8/1988 |
| JP | 04-275387 | 9/1992 |
| JP | 05-234578 | 9/1993 |
| JP | 09-320645 | 12/1997 |
| JP | 2001-313025 | 11/2001 |
| JP | 2001-351615 | 12/2001 |
| JP | 2002-513991 | 5/2002 |
| JP | 2002-518796 | 6/2002 |
| JP | 2002-528866 | 9/2002 |
| JP | 2002-289266 | 10/2002 |
| JP | 2003-217662 | 7/2003 |
| JP | 2003-346862 | 12/2003 |
| JP | 2004-504933 | 2/2004 |
| JP | 2005-503920 | 2/2005 |
| KR | 10/2001-0024927 | 3/2001 |
| KR | 2001-0043145 | 5/2001 |
| KR | 10-2002-0059419 | 7/2002 |
| WO | 98/28811 | 7/1998 |
| WO | 99/43034 | 8/1999 |
| WO | 99/57770 | 11/1999 |
| WO | 99/65101 | 12/1999 |
| WO | 00/51198 | 8/2000 |
| WO | 01/33651 | 5/2001 |
| WO | 01/39302 | 5/2001 |
| WO | 02/50933 | 6/2002 |
| WO | 02/095849 | 11/2002 |

(56) References Cited

FOREIGN PATENT DOCUMENTS

| WO | 2004/036669 | 4/2004 |
|----|-------------|--------|
| WO | 2005/038953 | 4/2005 |
| WO | 2005/038962 | 4/2005 |

OTHER PUBLICATIONS

U.S. Appl. No. 13/929,653, Notice of Allowance mailed Jun. 9, 2014.
KR patent application No. 10-2013-7020727, Office Action mailed May 22, 2014.
JP patent application No. 2006-552102, Office Action mailed Jul. 15, 2014.
U.S. Appl. No. 14/449,040, "Protected active metal electrode and battery cell structures with non-aqueous interlayer architecture," Visco et al., filed Jul. 31, 2014.
JP patent application No. 2006-552102, Decision to Grant mailed Aug. 25, 2014.
U.S. Appl. No. 13/464,835, Office Action mailed Jan. 9, 2015.
EP patent application No. 03809186.4, Exam Report mailed Mar. 24, 2015.
U.S. Appl. No. 14/449,040, Office Action mailed May 19, 2015.
U.S. Appl. No. 14/449,040, Notice of Allowance mailed Jul. 1, 2015.
U.S. Appl. No. 13/464,835, Notice of Allowance mailed Jul. 7, 2015.
JP patent application No. 2014-108250, Notification of Reasons for Rejection mailed Jun. 16, 2015.
U.S. Appl. No. 14/815,672, Office Action mailed Sep. 22, 2015.
U.S. Appl. No. 14/156,267, Office Action mailed Nov. 4, 2015.
International Search Report and Written Opinion dated Oct. 18, 2005 from International Application No. PCT/US2004/033372.
U.S. Appl. No. 11/092,781, Office Action mailed Jun. 16, 2006.
U.S. Appl. No. 11/092,781, Office Action mailed Feb. 1, 2007.
U.S. Appl. No. 11/092,781, Office Action mailed Jun. 25, 2007.
U.S. Appl. No. 11/092,781, Office Action mailed Feb. 22, 2008.
U.S. Appl. No. 10/686,189, Office Action mailed Oct. 12, 2006.
U.S. Appl. No. 10/686,189, Office Action mailed Apr. 11, 2007.
U.S. Appl. No. 10/731,771, Office Action mailed Sep. 28, 2006.
U.S. Appl. No. 10/731,771, Office Action mailed Mar. 16, 2007.
U.S. Appl. No. 10/772,157, Office Action mailed Nov. 1, 2007.
U.S. Appl. No. 10/772,157, Office Action mailed Feb. 6, 2008.
U.S. Appl. No. 10/772,157, Office Action mailed Jul. 11, 2008.
U.S. Appl. No. 10/772,157, Office Action mailed Dec. 30, 2008.
U.S. Appl. No. 11/824,548, Office Action mailed Mar. 20, 2008.
U.S. Appl. No. 11/824,548, Office Action mailed Jan. 26, 2009.
U.S. Appl. No. 10/825,587, Office Action mailed Jun. 25, 2007.
U.S. Appl. No. 10/825,587, Office Action mailed Apr. 1, 2008.
U.S. Appl. No. 10/825,587, Office Action mailed Jun. 5, 2008.
U.S. Appl. No. 10/825,587, Office Action mailed Oct. 16, 2008.
U.S. Appl. No. 10/772,228, Office Action mailed Sep. 21, 2007.
U.S. Appl. No. 10/772,228, Office Action mailed Nov. 28, 2006.
U.S. Appl. No. 10/824,944, Office Action mailed Mar. 12, 2007.
U.S. Appl. No. 10/824,944, Office Action mailed Sep. 7, 2006.
U.S. Appl. No. 11/245,472, Office Action mailed Aug. 23, 2007.
U.S. Appl. No. 11/245,472, Office Action mailed Apr. 16, 2008.
U.S. Appl. No. 10/986,441, Office Action mailed Oct. 20, 2008.
U.S. Appl. No. 11/823,847, Office Action mailed Sep. 16, 2008.
U.S. Appl. No. 12/649,245, Office Action mailed Mar. 31, 2010.
U.S. Appl. No. 10/825,587, Notice of Allowance mailed Nov. 24, 2008.
U.S. Appl. No. 10/772,228, Notice of Allowance mailed Jan. 22, 2008.
U.S. Appl. No. 11/824,574, Office Action mailed Dec. 31, 2008.
China patent application No. 2003801061464, First Office Action mailed Oct. 27, 2006.
Nippon Telegr & Teleph Corp., "Patent Abstracts of Japan," vol. 008, No. 119 (E-248), Jun. 5, 1984 & JP 59 031573 A, Feb. 20, 1984.
Anders et al., "Plasma is Produced Simply", R&D Research & Development, R&D Magazine, vol. 39, No. 10, Sep. 1997, www.rdmag.corn, p. 65.
Steven D. Jones, et al., "Thin film rechargeable Li batteries", 1994, Solid State Ionics.
J.B. Bates, et al., "Thin-film rechargeable lithium Sources batteries," 1995, Journal of Power Sources.
N. J. Dudney, et al., "Sputtering of lithium compounds for preparation of electrolyte thin films," 1992, Solid State Ionics.
J. B. Bates, et al., "Electrical properties of amorphous lithium electrolye thin films," 1992, Solid State Ionics.
Xiaohua Yu, et al, "A Stable Thin-Film Lithium Electrolyte: Lithium Phosphorus Oxynitride," Feb. 1997, J. Electrochem. Soc., vol. 144, No. 2.
Fu, Jie, "Fast Li+ Ion Conduction in Li2O—Al2O3—TiO2—SiO2—P2O5 Glass-Ceramics", Journal of the American Ceramics Society, vol. 80, No. 7, Jul. 1997, pp. 1-5.
Aono et al., "Ionic Conductivity of the Lithium Titanium Phosphate ($Li_{1+x}XM_XTi_{2-X}(PO_4)_3$, M = Al, Sc, Y, and La) Systems", Dept. of Industrial Chemistry, pp. 590-591, Aug. 19, 1988.
Aono, Hiromichi, "High Li+ Conducting Ceramics", Acc. Chem. Res. vol. 27, No. 9, 1994, pp. 265-270.
Aono, et al., "Ionic Conductivity and Sinterability of Lithium Titanium Phosphate System", Solid State Ionics, 40/41 (1990), pp. 38-42.
Aono, et al., "Electrical properties and crystal structure of solid electrolyte based on lithium hafnium phosphate $LiHf_2(PO_4)_3$", Solid State Ionics 62 (1993), pp. 309-316.
Aono, et al., "Electrical property and sinterability of $LiTi_2(PO_4)_3$ mixed with lithium salt ($Li_3PO_4$ or $Li_3BO_3$)", Solid State Ionics 47 (1991) pp. 257-264.
Aono, et al., "Ionic Conductivity of $\beta=Fc_2(SO_4)_3$ Type $Li_3Cr_2(PO_4)_3$ Based Electrolyte", Chemistry Letters, 1993, pp. 2033-2036.
Aono, et al., "Ionic Conductivity of $LiTi_2(PO_4)_3$ Mixed with Lithium Salts", Chemistry Letters, 1990, pp. 331-334.
Fu, Jie, "Superionic conductivity of glass-ceramics in the system $Li_2O—Al_2O_3—TiO_3—P_2O_5$", Solid State Ionics, 96 (1997), pp. 195-200.
Fu, Jie, "Fast Li+ ion conducting glass-ceramics in the system $Li_2O—Al_2O_3—GeO_2—P_2O_5$" Solid State Ionics 104 (1997), pp. 191-194.
Aono, et al., "DC Conductivity of $Li_{1.3}Al_{0.3}Ti_{1.7}(PO_4)_3$" Ceramic with Li Electrodes, Chemistry Letters, 1991, pp. 1567-1570.
Aono, et al., "Electrical Properties of Sintered Lithium Titanium Phosphate Ceramics ($Li_{1+x}M_XTi_{2-X}PO_4)_3, M^{3+}=Al^{3+}, Sc^{3+}, or Y^{3+}$)", Chemistry Letters, 1990, pp. 1825-1828.
Button, et al., "Structural disorder and enhanced ion transport in amorphous conductors", Solid State Ionics, vols. 9-10, Part 1, Dec. 1983, pp. 585-592 (abstract).
Shuster, Nicholas, "Lithium Water Power Source for Low Power—Long Duration Undersea Applications", Westinghouse Electric Corporation, 1990 IEEE, pp. 118-123.
VanVoorhis, et al., "Evaluation of Air Cathodes for Lithium/Air Batteries", Electrochemical Society Proceedings vol. 98-16, 1999, pp. 383-390.
Blurton et al., "Metal/Air Batteries: Their Status and Potential—A Review", Journal of Power Sources, 4, (1979), pp. 263-279.
J. Read, "Characterization of the Lithium/Oxygen Organic Electrolyte Battery", Journal of the Electrochemical Society, 149 (9) (2002), pp. A1190-A1195.
Abraham et al., "A Polymer Electrolyte-Based Rechargeable Lithium/Oxygen Battery", Technical Papers, Electrochemical Science and Technology, J. Electrochem. Soc., vol. 143, No. 1, Jan. 1996, pp. 1-5.
Kessler, et al., "Large Microsheet Glass for 40-in. Class PALC Displays", 1997, FMC2-3, pp. 61-63.
Feng et al., "Electrochemical behavior of intermetallic-based metal hydrides used in Ni/metal hydride (MH) batteries: a review", International Journal of Hydrogen Energy, 26 (2001), pp. 725-734.
Iwakura et al., "All solid-state nickel/metal hydride battery with a proton-conductive phosphoric acid-doped silica gel electrolyte", Electrochimica Acta 48 (2003), pp. 1499-1503.
Li et al., "Lithium-Ion Cells with Aqueous Electrolytes", J. Electrochem. Soc., vol. 142, No. 6, Jun. 1995, pp. 1742-1746.
Zhang et al., "Electrochemical Lithium Intercalation in $VO_2(B)$ in Aqueous Electrolytes", J. Electrochem. Soc., vol. 143, No. 9, Sep. 1996, pp. 2730-2735.

(56) References Cited

OTHER PUBLICATIONS

Urquidi-Mcdonald, Mirna, "Hydrogen storage and semi-fuel cells", http://engr.psu.edu/h2e/Pub/Macdonald1.htm, (downloaded Jan. 27, 2004, 3 pages).

Urquidi-Mcdonald, et al., "Lithium/poly(organophosphazene) membrane anodes in KOH and seawater", Electrochimica Acta 47, (2002), pp. 2495-2503.

Nimon et al., "Stability of Lithium Electrode in Contact with Glass Electrolytes", SSI-14, Jun. 22-27, 2003, Monterey, CA. (conference poster).

Nimon et al., "Stability of Lithium Electrode in Contact with Glass Electrolytes", SSI-14 Conference, Monterey, CA, Jun. 22, 2003, Abstract of Poster.

Inaguma et al., "High Ionic Conductivity in Lithium Lanthanum Titanate", Solid State Communications, vol. 86, No. 10, pp. 689-693, 1993.

Kobayashi et al., "All-solid-state lithium secondary battery with ceramic-polymer composite electrolyte", Solid State Ionics 152-153 (2002) 137-142.

Will et al., "Primary Sodium Batteries with Beta-Alumina Solid Electrolyte", J. Electrochemical Science and Technology, Apr. 1975, vol. 122, No. 4, pp. 457-461.

EP patent application No. 03809186.4, Examination Report dated Mar. 21, 2006.

International patent application No. PCT/US2004/033371, International Search Report dated Mar. 6, 2006.

International patent application No. PCT/US2004/033424, International Search Report dated Jan. 6, 2006.

Galbraith, A.D., "The lithium-water-air battery for automotive propulsion", XP002355800, retrieved from STN Database accession No. 1979:106901 abstract and Symp. Int. Veh. Electr., Rapp, $4^{TH}$ vol. 1, paper 32.4, 23 pp., Publisher: Electr. Veh. Counc., New York, N.Y. Conden: 39UPAD, 1976.

International patent application No. PCT/US2004/033361, International Search Report and Written Opinion dated Jan. 16, 2006.

International patent application No. PCT/US2004/033424, International Search Report and Written Opinion dated Mar. 6, 2006.

West, et al., "Chemical stability enhancement of lithium conducting solid electrolyte plates using sputtered LiPON thin films", Journal of Power Sources, vol. 126, Issues 1-2, pp. 1-272 (Feb. 16, 2004).

International patent application No. PCT/US2004/033424, Invitation to Pay Additional Fees dated Jan. 6, 2006.

EP patent application No. 04794699.1, Examination Report dated May 31, 2007.

WO patent application No. PCT/US06/45407, International Search Report and Written Opinion, mailed Aug. 30, 2007.

CN patent application No. 200480037293.5, Office Action mailed Aug. 22, 2008.

EP patent application No. 04794699.1, Examination Report mailed Aug. 5, 2008.

AU patent application No. 2003301383, Examination Report mailed Sep. 29, 2008.

CN patent application No. 200480042697.3, Office Action mailed Feb. 15, 2008.

U.S. Appl. No. 11/245,472, Office Action mailed Jul. 24, 2008.

CN patent application No. 200480042697.3, Office Action mailed Dec. 19, 2008.

Thokchom, Joykumar S., et al., Water Durable Lithium Ion Conducting Composite Membranes from the $Li_2O$—$Al_2O_3$—$TiO_2$—$P_2O_5$ Glass-Ceramic, *Journal of The Electrochemical Society*, 154(4), 2007, pp. A331-A336.

U.S. Appl. No. 11/245,472, Office Action mailed Jan. 8, 2009.

U.S. Appl. No. 11/824,579, Office Action mailed Jan. 29, 2009.

U.S. Appl. No. 11/823,847, Office Action mailed Apr. 28, 2009.

CN patent application No. 200480042697.3, Office Action mailed Jun. 5, 2009.

U.S. Appl. No. 11/245,472, Office Action mailed Jul. 8, 2009.

AU patent application No. 2004306866, Exam Report mailed Apr. 9, 2009.

AU patent application No. 2004316638, Office Action mailed Aug. 3, 2009.

U.S. Appl. No. 10/986,441, Notice of Allowance mailed Jun. 19, 2009.

U.S. Appl. No. 10/772,157, Notice of Allowance mailed Sep. 17, 2009.

International patent application No. PCT/US06/48755, International Search Report mailed Apr. 7, 2008.

International patent application No. PCT/US06/48755, Written Opinion mailed Apr. 7, 2008.

Ogasawara T. et al., "Rechargeable $Li_2O_2$ Electrode for Lithium Batteries", J. Am. Chem. Soc. 128(4), 2006, pp. 1390-1393.

Foster D.L. et al., "Ceramic Membranes for Lithium Batteries", Proceeding of the $42^{nd}$ Power Sources Conference, Jun. 2006, p. 2.14.

Read J., "Electrolyte Formulation and Temperature Performance of the $Li/O_2$ Battery", Proceeding of the $9^{th}$ Electrochemical Power Sources R&D Symposium, Jun. 2005, 15 pages.

EP patent application No. 04794699.1, Notice of Allowance mailed Jun. 10, 2009.

U.S. Appl. No. 12/334,116, Office Action mailed Oct. 27, 2009.

EP patent application No. 03809186.4, Examination Report mailed Nov. 24, 2009.

U.S. Appl. No. 11/824,548, Notice of Allowance mailed Dec. 17, 2009.

U.S. Appl. No. 11/245,472, Office Action mailed Feb. 4, 2010.

U.S. Appl. No. 12/475,403, Office Action mailed Feb. 8, 2010.

AU patent application No. 2003301383, Notice of Acceptance mailed Nov. 26, 2009.

CN patent application No. 200480037293.5, Office Action mailed Jan. 29, 2010.

EP patent application No. 04794655.3, Examination Report mailed Apr. 22, 2010.

CA patent application No. 2,502,438, Examination Report mailed May 12, 2010.

U.S. Appl. No. 11/562,883, Office Action mailed Jun. 7, 2010.

AU patent application No. 2006280097, Examination Report mailed Jun. 9, 2010.

JP patent application no. 2004-545584, Notification of reason for rejection mailed Jun. 8, 2010.

U.S. Appl. No. 12/475,403, Office Action mailed Jun. 22, 2010.

U.S. Appl. No. 11/824,579, Office Action mailed Jun. 25, 2010.

CN patent application No. 200480037293.5, Office Action mailed Jun. 24, 2010.

AU patent application No. 2004306866, Notice of Acceptance mailed Jun. 17, 2010.

U.S. Appl. No. 12/831,066, "Active Metal Fuel Cells", Visco et al., filed Jul. 6, 2010.

U.S. Appl. No. 12/649,245, Office Action mailed Jul. 19, 2010.

U.S. Appl. No. 12/831,066, Office Action mailed Aug. 18, 2010.

U.S. Appl. No. 11/824,597, Notice of Allowance mailed Sep. 9, 2010.

KR patent application No. 10-2005-7006382, Office Action mailed Aug. 31, 2010.

U.S. Appl. No. 12/475,403, Notice of Allowance mailed Oct. 7, 2010.

U.S. Appl. No. 12/907,819, "In situ formed ionically conductive membranes for protection of active metal anodes and battery cells", Visco et al., filed Oct. 19, 2010.

Thangadurai, Venkataraman et al., "Novel fast lithium ion conduction in garnet-type $Li_5La_3M_2O_{12}$ (M = Nb, Ta)", J. Am. Chem. Soc. 86 (3) 437-40 (2003), Oct. 21, 2002.

U.S. Appl. No. 12/649,245, Office Action mailed Nov. 30, 2010.

U.S. Appl. No. 11/612,741, Office Action mailed Nov. 29, 2010.

U.S. Appl. No. 11/562,883, Office Action mailed Jan. 19, 2011.

U.S. Appl. No. 12/831,066, Office Action mailed Jan. 19, 2011.

CA patent application No. 2,542,304, Examination Report mailed Apr. 4, 2011.

U.S. Appl. No. 12/831,066, Notice of Allowance mailed Apr. 6, 2011.

U.S. Appl. No. 12/907,819, Office Action mailed May 12, 2011.

Visco, S.J. et al., "Lithium-Air", Encyclopedia of Electrochemical Power Sources, Dyer (editor), Elsevier, 2009, ISBN: 9780444527455, pp. 376-383.

CA patent application No. 2,555,637, Exam Report mailed May 10, 2011.

(56) References Cited

OTHER PUBLICATIONS

KR patent application No. 10-2006-7017692, Notice to Submit Response mailed May 13, 2011.
JP patent application No. 2006-535572, Office Action mailed Jun. 21, 2011.
JP patent application No. 2006-552102, Office Action mailed Jul. 5, 2011.
U.S. Appl. No. 11/612,741, Office Action mailed Jul. 22, 2011.
U.S. Appl. No. 12/649,245, Notice of Allowance mailed Sep. 14, 2011.
KR patent application No. 2006-7007309, Office Action mailed Jul. 27, 2011.
KR patent application No. 2005-7006382, Office Action mailed Aug. 10, 2011.
U.S. Appl. No. 12/907,819, Notice of Allowance mailed Nov. 10, 2011.
U.S. Appl. No. 13/236,428, Office Action mailed Nov. 16, 2011.
U.S. Appl. No. 13/336,459, "Solid State Battery", Visco et al., filed Dec. 23, 2011.
CN patent application No. 200910174918.7, Office Action mailed Oct. 19, 2011.
U.S. Appl. No. 11/612,741, Notice of Allowance mailed Feb. 3, 2012.
U.S. Appl. No. 11/612,741, Allowed Claims, Feb. 3, 2012.
CA patent application No. 2,542,304, Exam Report mailed Apr. 3, 2012.
KR patent application No. 9-5-2012-016417008, Office Action mailed Mar. 21, 2012.
U.S. Appl. No. 13/236,428, Notice of Allowance mailed Apr. 25, 2012.
U.S. Appl. No. 13/236,428, Allowed Claims, Apr. 25, 2012.
U.S. Appl. No. 12/888,154, Office Action mailed May 3, 2012.
KR patent application No. 10-2005-7006382, Office Action mailed Mar. 31, 2012.
U.S. Appl. No. 13/464,835, "Protected lithium electrodes having tape cast ceramic and glass-ceramic membranes," Visco et al., filed May 4, 2012.
U.S. Appl. No. 13/336,459, Office Action mailed Jun. 7, 2012.
U.S. Appl. No. 13/453,964, "Substantially impervious lithium super ion conducting membranes," Visco et al., filed Apr. 23, 2012.
U.S. Appl. No. 13/182,322, Office Action mailed Jul. 5, 2012.
EP patent application No. 03809186.4, Exam Report mailed Jun. 21, 2012.
U.S. Appl. No. 13/453,964, Notice of Allowance mailed Aug. 14, 2012.
U.S. Appl. No. 12/888,154, Notice of Allowance mailed Aug. 20, 2012.
U.S. Appl. No. 13/464,835, Office Action mailed Sep. 25, 2012.
U.S. Appl. No. 13/182,322, Notice of Allowance mailed Sep. 19, 2012.
JP patent application No. 2006-552102, Office Action mailed Sep. 25, 2012.
KR patent application No. 10-2005-7006382, Notice to Submit Response mailed Oct. 30, 2012.
KR patent application No. 9-5-2012-016417008, Notice of Allowance mailed Nov. 23, 2012.
U.S. Appl. No. 13/717,255, "Active Metal Fuel Cells," Visco et al., filed Dec. 17, 2012.
Licht et al., "A solid sulfur cathode for aqueous batteries," *Science*, vol. 261, No. 5124 (Aug. 20, 1993) 1029-1032.
Licht et al., "Investigation of a novel aqueous aluminum/sulfur battery," *Journal of Power Sources*, 45 (1993) 311-323.
U.S. Appl. No. 13/673,789, Office Action mailed Feb. 28, 2013.
U.S. Appl. No. 13/615,351, Office Action mailed Mar. 25, 2013.
CA patent application No. 2,542,304, Office Action mailed Jan. 30, 2013.
U.S. Appl. No. 13/464,835, Office Action mailed May 2, 2013.
U.S. Appl. No. 13/615,351, Notice of Allowance mailed May 31, 2013.
U.S. Appl. No. 11/562,883, Office Action mailed Jun. 10, 2013.
U.S. Appl. No. 13/708,540, Office Action mailed Jun. 17, 2013.
U.S. Appl. No. 13/464,835, Office Action mailed Aug. 29, 2013.
Choi et al., "Challenges facing lithium batteries and electrical double-layer capacitors," www.angewandte.org Angew. Chem. Int. Ed. 2012, 51, 9994-10024 (31 pages).
Freunberger et al., "Reactions in the rechargeable lithium-$O_2$ battery with alkyl carbonate electrolytes," ACS Publications, J. Am. Chem. Soc. 2011, 133, 8040-8047 (8 pages).
Freunberger et al., "The lithium-oxygen battery with ether-based electrolytes," Wiley Online Library, Angew. Chem. Int. Ed. 2011, 50, 1-6 (6 pages).
CA patent application No. 2,542,304, Notice of Allowance mailed Aug. 18, 2013.
TW patent application No. 097122683, Office Action mailed Aug. 13, 2013.
U.S. Appl. No. 13/673,789, Notice of Allowance mailed Oct. 1, 2013.
U.S. Appl. No. 13/708,540, Office Action mailed Oct. 16, 2013.
U.S. Appl. No. 11/562,883, Notice of Allowance mailed Oct. 17, 2013.
JP patent application No. 2006-552102, Office Action mailed Nov. 26, 2013.
KR patent application No. 2013-078956319, Notice to Submit Response mailed Nov. 18, 2013.
U.S. Appl. No. 13/464,835, Office Action mailed Jan. 16, 2014.
Linden and T.B. Reddy, *Handbook of Batteries*, McGraw-Hill, NY 3$^{rd}$ Edition, 2002, p. 38.5.
U.S. Appl. No. 14/156,267, "Protected lithium electrodes having a porous electrolyte interlayer and associated battery cells," Visco et al., filed Jan. 15, 2014.
U.S. Appl. No. 13/717,255, Notice of Allowance mailed Jan. 30, 2014.
WO2009/003695, machine English translation, Jan. 2009.
WO2013/010692, machine English translation, Jan. 2013.
BR patent application No. P10415312.0, Search and Exam Report mailed Mar. 6, 2014.
U.S. Appl. No. 13/708,540, Office Action mailed Apr. 17, 2014.
U.S. Appl. No. 13/708,540, Notice of Allowance mailed May 23, 2014.
U.S. Appl. No. 14/156,267, Notice of Allowance mailed Mar. 9, 2016.
U.S. Appl. No. 14/809,083, Office Action mailed Apr. 4, 2016.
U.S. Appl. No. 14/815,672, Office Action mailed Apr. 29, 2016.

ADVANCED LITHIUM ION BATTERIES BASED ON SOLID STATE PROTECTED LITHIUM ELECTRODES

CROSS-REFERENCE TO RELATED APPLICATIONS

This application is a continuation of U.S. patent application Ser. No. 13/708,540, filed Dec. 7, 2012, titled PROTECTED LITHIUM ELECTRODES BASED ON SINTERED CERAMIC OR GLASS CERAMIC MEMBRANES, now U.S. Pat. No. 8,778,522, issued Jul. 15, 2014; which is a continuation of U.S. patent application Ser. No. 13/336,459, filed Dec. 23, 2011, titled SOLID STATE BATTERY, now abandoned; which is a continuation of U.S. patent application Ser. No. 12/907,819, filed Oct. 19, 2010, titled IN SITU FORMED IONICALLY CONDUCTIVE MEMBRANES FOR PROTECTION OF ACTIVE METAL ANODES AND BATTERY CELLS, now U.S. Pat. No. 8,114,171, issued Feb. 14, 2012; which is a continuation of U.S. patent application Ser. No. 12/475,403, filed May 29, 2009, titled PROTECTIVE COMPOSITE BATTERY SEPARATOR AND ELECTROCHEMICAL DEVICE COMPONENT WITH RED PHOSPHORUS, now U.S. Pat. No. 7,838,144, issued Nov. 23, 2010; which is a continuation of U.S. patent application Ser. No. 11/824,574, filed Jun. 29, 2007, titled IONICALLY CONDUCTIVE MEMBRANES FOR PROTECTION OF ACTIVE METAL ANODES AND BATTERY CELLS, now abandoned; which is a continuation of U.S. patent application Ser. No. 10/772,228, filed Feb. 3, 2004, titled IONICALLY CONDUCTIVE MEMBRANES FOR PROTECTION OF ACTIVE METAL ANODES AND BATTERY CELLS, now U.S. Pat. No. 7,390,591, issued Jun. 24, 2008; which is a continuation-in-part of U.S. patent application Ser. No. 10/731,771 filed Dec. 5, 2003, titled IONICALLY CONDUCTIVE COMPOSITES FOR PROTECTION OF ACTIVE METAL ANODES, now U.S. Pat. No. 7,282,302, issued Oct. 16, 2007; which is a continuation-in-part of U.S. patent application Ser. No. 10/686,189 filed Oct. 14, 2003, titled IONICALLY CONDUCTIVE COMPOSITES FOR PROTECTION OF ACTIVE METAL ANODES, now U.S. Pat. No. 7,282,296, issued Oct. 16, 2007; which claims priority to U.S. Provisional Patent Application No. 60/418,899 filed Oct. 15, 2002, titled IONICALLY CONDUCTIVE COMPOSITES FOR PROTECTION OF ANODES AND ELECTROLYSES.

This application also claims priority through prior application Ser. No. 10/772,228 in its chain of priority to U.S. Provisional Patent Application No. 60/511,710 filed Oct. 14, 2003, titled IONICALLY CONDUCTIVE COMPOSITES FOR PROTECTION OF ACTIVE METAL ELECTRODES IN CORROSIVE ENVIRONMENTS and U.S. Provisional Patent Application No. 60/518,948 filed Nov. 10, 2003, titled BI-FUNCTIONALLY COMPATIBLE IONICALLY COMPOSITES FOR ISOLATION OF ACTIVE METAL ELECTRODES IN A VARIETY OF ELECTROCHEMICAL CELLS AND SYSTEMS.

Each of these prior applications is incorporated herein by reference in its entirety and for all purposes.

BACKGROUND OF THE INVENTION

1. Field of the Invention

The present invention relates generally to separators and electrode structures for use in batteries. More particularly, this invention relates to ionically conductive membranes for protection of active metal anodes from deleterious reaction with air, moisture and other battery components, battery cells incorporating such protected anodes and methods for their fabrication.

2. Description of Related Art

The low equivalent weight of alkali metals, such as lithium, renders them particularly attractive as a battery electrode component. Lithium provides greater energy per volume than the traditional battery standards, nickel and cadmium. Unfortunately, no rechargeable lithium metal batteries have yet succeeded in the market place.

The failure of rechargeable lithium metal batteries is largely due to cell cycling problems. On repeated charge and discharge cycles, lithium "dendrites" gradually grow out from the lithium metal electrode, through the electrolyte, and ultimately contact the positive electrode. This causes an internal short circuit in the battery, rendering the battery unusable after a relatively few cycles. While cycling, lithium electrodes may also grow "mossy" deposits which can dislodge from the negative electrode and thereby reduce the battery's capacity.

To address lithium's poor cycling behavior in liquid electrolyte systems, some researchers have proposed coating the electrolyte facing side of the lithium negative electrode with a "protective layer." Such protective layer must conduct lithium ions, but at the same time prevent contact between the lithium electrode surface and the bulk electrolyte. Many techniques for applying protective layers have not succeeded.

Some contemplated lithium metal protective layers are formed in situ by reaction between lithium metal and compounds in the cell's electrolyte which contact the lithium. Most of these in situ films are grown by a controlled chemical reaction after the battery is assembled. Generally, such films have a porous morphology allowing some electrolyte to penetrate to the bare lithium metal surface. Thus, they fail to adequately protect the lithium electrode.

Various pre-formed lithium protective layers have been contemplated. For example, U.S. Pat. No. 5,314,765 (issued to Bates on May 24, 1994) describes an ex situ technique for fabricating a lithium electrode containing a thin layer of sputtered lithium phosphorus oxynitride ("LiPON") or related material. LiPON is a glassy single ion conductor (conducts lithium ion) which has been studied as a potential electrolyte for solid state lithium microbatteries that are fabricated on silicon and used to power integrated circuits (See U.S. Pat. Nos. 5,597,660, 5,567,210, 5,338,625, and 5,512,147, all issued to Bates et al.).

Work in the present applicants' laboratories has developed technology for the use of glassy or amorphous protective layers, such as LiPON, in active metal battery electrodes. (See, for example, U.S. Pat. No. 6,025,094, issued Feb. 15, 2000, U.S. Pat. No. 6,402,795, issued Jun. 11, 2002, U.S. Pat. No. 6,214,061, issued Apr. 10, 2001 and U.S. Pat. No. 6,413,284, issued Jul. 2, 2002, all assigned to PolyPlus Battery Company). Despite this progress, alternative protective layers and structures, that could also enhance active metal, particularly lithium metal, battery performance, continue to be sought. In particular, protective layers that combine the characteristics of high ionic conductivity and chemical stability to materials and conditions on either side of the protective layer are desired.

SUMMARY OF THE INVENTION

The present invention provides ionically conductive membranes for decoupling the active metal anode and cathode sides of an active metal electrochemical cell, and methods for their fabrication. The membranes may be incorporated in active metal negative electrode (anode) structures and electrochemical devices and components, including battery and fuel cells. The membranes are highly conductive for ions of the active metal, but are otherwise substantially impervious.

They are chemically stable on one side to the active metal of the anode (e.g., lithium), and on the other side to the cathode, other battery cell components such as solid or liquid phase electrolytes, including organic or aqueous liquid electrolytes, ambient conditions and other environments corrosive to the active metal of the anode if directly contacted with it. The membrane is capable of protecting an active metal anode from deleterious reaction with other battery components or ambient conditions and decoupling the chemical environments of the anode and cathode enabling use of anode-incompatible materials, such as solvents and electrolytes, on the cathode side without deleterious impact on the anode, and vice versa. This broadens the array of materials that may be used in active metal electrochemical cells and facilitates cell fabrication while providing a high level of ionic conductivity to enhance performance of an electrochemical cell in which the membrane is incorporated.

The membrane may have any suitable composition, for example, it may be a monolithic material chemically compatible with both the anode and cathode environments, or a composite composed of at least two components of different materials having different chemical compatibilities, one chemically compatible with the anode environment and the other chemically compatible with the cathode environment.

Composite membranes may be composed of a laminate of discrete layers of materials having different chemical compatibility requirements, or it may be composed of a gradual transition between layers of the materials. By "chemical compatibility" (or "chemically compatible") it is meant that the referenced material does not react to form a product that is deleterious to battery cell operation when contacted with one or more other referenced battery cell components or manufacturing, handling or storage conditions. A first material layer (or first layer material) of the composite is ionically conductive, and chemically compatible with an active metal electrode material. Chemical compatibility in this aspect of the invention refers both to a material that is chemically stable and therefore substantially unreactive when contacted with an active metal electrode material. It may also refer to a material that is chemically stable with air, to facilitate storage and handling, and reactive when contacted with an active metal electrode material to produce a product that is chemically stable against the active metal electrode material and has the desirable ionic conductivity (i.e., a first layer material). Such a reactive material is sometimes referred to as a "precursor" material. A second material layer of the composite is substantially impervious, ionically conductive and chemically compatible with the first material. Additional layers are possible to achieve these aims, or otherwise enhance electrode stability or performance. All layers of the composite have high ionic conductivity, at least $10^{-7}$ S/cm, generally at least $10^{-6}$ S/cm, for example at least $10^{-5}$ S/cm to $10^{-4}$ S/cm, and as high as $10^{-3}$ S/cm or higher so that the overall ionic conductivity of the multi-layer protective structure is at least $10^{-7}$ S/cm and as high as $10^{-3}$ S/cm or higher.

A wide variety of materials may be used in fabricating protective composites in accordance with the present invention, consistent with the principles described above. For example, the first layer, in contact with the active metal, may be composed, in whole or in part, of active metal nitrides, active metal phosphides, active metal halides or active metal phosphorus oxynitride-based glass. Specific examples include $Li_3N$, $Li_3P$, LiI, LiBr, LiCl, LiF and LiPON. Active metal electrode materials (e.g., lithium) may be applied to these materials, or they may be formed in situ by contacting precursors such as metal nitrides, metal phosphides, metal halides, red phosphorus, iodine, nitrogen or phosphorus containing organics and polymers, and the like with lithium. The in situ formation of the first layer may result from an incomplete conversion of the precursors to their lithiated analog. Nevertheless, such incomplete conversions meet the requirements of a first layer material for a protective composite in accordance with the present invention and are therefore within the scope of the invention.

A second layer of the protective composite may be composed of a material that is substantially impervious, ionically conductive and chemically compatible with the first material or precursor and environments normally corrosive to the active metal of the anode, including glassy or amorphous metal ion conductors, such as a phosphorus-based glass, oxide-based glass, phosphorus-oxynitride-based glass, sulfur-based glass, oxide/sulfide based glass, selenide based glass, gallium based glass, germanium-based glass or boracite glass (such as are described D. P. Button et al., Solid State Ionics, Vols. 9-10, Part 1, 585-592 (December 1983); ceramic active metal ion conductors, such as lithium beta-alumina, sodium beta-alumina, Li superionic conductor (LISICON), Na superionic conductor (NASICON), and the like; or glass-ceramic active metal ion conductors. Specific examples include LiPON, $Li_3PO_4.Li_2S.SiS_2$, $Li_2S.GeS_2.Ga_2S_3$, $Li_2O.11Al_2O_3$, $Na_2O.11Al_2O_3$, $(Na, Li)_{1+x}Ti_{2-x}Al_x(PO_4)_3$ ($0.6 \leq x \leq 0.9$) and crystallographically related structures, $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, $Li_5ZrP_3O_{12}$, $Li_5TiP_3O_{12}$, $Li_3Fe_2P_3O_{12}$ and $Li_4NbP_3O_{12}$, and combinations thereof, optionally sintered or melted. Suitable ceramic ion active metal ion conductors are described, for example, in U.S. Pat. No. 4,985,317 to Adachi et al., incorporated by reference herein in its entirety and for all purposes.

A particularly suitable glass-ceramic material for the second layer of the protective composite is a lithium ion conductive glass-ceramic having the following composition:

| Composition | mol % |
| --- | --- |
| $P_2O_5$ | 26-55% |
| $SiO_2$ | 0-15% |
| $GeO_2 + TiO_2$ | 25-50% |
| in which   $GeO_2$ | 0-50% |
| $TiO_2$ | 0-50% |
| $ZrO_2$ | 0-10% |
| $M_2O_3$ | 0-10% |
| $Al_2O_3$ | 0-15% |
| $Ga_2O_3$ | 0-15% |
| $Li_2O$ | 3-25% | and containing a predominant crystalline phase composed of $Li_{1+x}(M,Al,Ga)_x(Ge_{1-y}Ti_y)_{2-x}(PO_4)_3$ where $X \leq 0.8$ and $0 \leq Y \leq 1.0$, and where M is an element selected from the group consisting of Nd, Sm, Eu, Gd, Tb, Dy, Ho, Er, Tm and Yb and/or $Li_{1+x+y}Q_xTi_{2-x}Si_yP_{3-y}O_{12}$ where $0 < X \leq 0.4$ and $0 < Y \leq 0.6$, and where Q is Al or Ga. The glass-ceramics are obtained by melting raw materials to a melt, casting the melt to a glass and subjecting the glass to a heat treatment. Such materials are available from OHARA Corporation, Japan and are further described in U.S. Pat. Nos. 5,702,995, 6,030,909, 6,315,881 and 6,485,622, incorporated herein by reference.

Either layer may also include additional components. For instance, a suitable active metal compatible layer (first layer) may include a polymer component to enhance its properties. For example, polymer-iodine complexes like poly(2-vinylpyridine)-iodine (P2VP-$I_2$), polyethylene-iodine, or tetraalkylammonium-iodine complexes can react with Li to form a LiI-based film having significantly higher ionic conductivity than that for pure LiI. Also, a suitable first layer may include a material used to facilitate its use, for example, the residue of a wetting layer (e.g., Ag) used to prevent reaction between vapor phase lithium (during deposition) and LiPON when LiPON is used as a first layer material.

In solid state embodiments, a suitable second layer may include a polymer component to enhance its properties. For example, a glass-ceramic active metal ion conductor, like the glass-ceramic materials described above, may also be combined with polymer electrolytes to form flexible composite sheets of material which may be used as second layer of the protective composite. One important example of such a flexible composite material has been developed by OHARA Corp. (Japan). It is composed of particles of a Li-ion conducting glass-ceramic material, such as described above, and a solid polymer electrolyte based on PEO-Li salt complexes. OHARA Corp. manufactures this material in the form of sheet with a thickness of about 50 microns that renders it flexible while maintaining its high ionic conductivity. Because of its relatively high ionic conductivity (better than $4*40^{-5}$ S/cm at room temperature in the case of the OHARA product) and stability toward metallic Li, this type of composite electrolyte can be used at room temperature or elevated temperatures in fully solid-state cells.

In addition, the layers may be formed using a variety of techniques. These include deposition or evaporation (including e-beam evaporation) of layers of material, such as $Li_3N$ or an ionically conductive glass. Also, as noted above, the active metal electrode adjacent layer may be formed in situ from the non-deleterious reaction of one or more precursors with the active metal electrode. For example, a $Li_3N$ layer may be formed on a Li anode by contacting $Cu_3N$ with the Li anode surface, or $Li_3P$ may be formed on a Li anode by contacting red phosphorus with the Li anode surface.

The invention encompasses protected anode structures with fully-formed protective layers and battery separators incorporating ambient stable precursors, each of which may be handled or stored in normal ambient atmospheric conditions without degradation prior to incorporation into a battery cell. Battery cells and methods for making composites and battery cells are also provided.

These and other features of the invention are further described and exemplified in the detailed description below.

DETAILED DESCRIPTION OF SPECIFIC EMBODIMENTS

Figure 1:
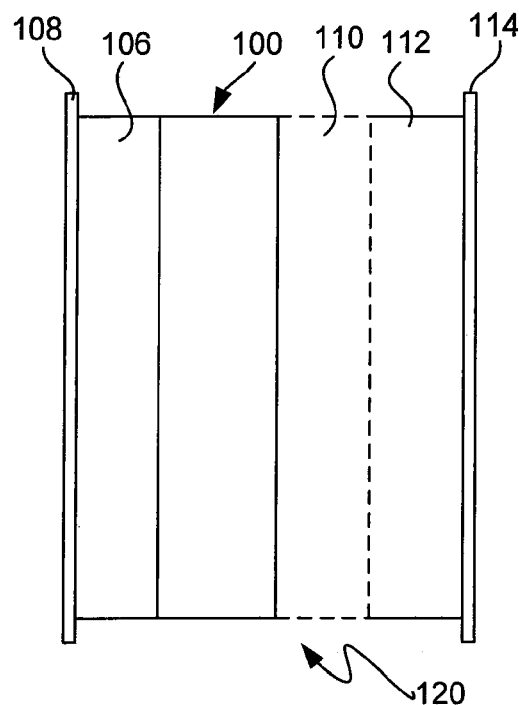
FIG. 1 is a schematic illustration of an active metal battery cell incorporating an ionically conductive protective membrane in accordance with the present invention.

Reference will now be made in detail to specific embodiments of the invention. Examples of the specific embodiments are illustrated in the accompanying drawings. While the invention will be described in conjunction with these specific embodiments, it will be understood that it is not intended to limit the invention to such specific embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail so as not to unnecessarily obscure the present invention.

When used in combination with "comprising," "a method comprising," "a device comprising" or similar language in this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

Introduction

The present invention provides ionically conductive membranes for decoupling the active metal anode and cathode sides of an active metal electrochemical cell, and methods for their fabrication. The membranes may be incorporated in active metal negative electrode (anode) structures and electrochemical devices and components, including battery and fuel cells. The membranes are highly conductive for ions of the active metal, but are otherwise substantially impervious. They are chemically stable on one side to the active metal of the anode (e.g., lithium), and on the other side to the cathode, other battery cell components such as solid or liquid phase electrolytes, including organic or aqueous liquid electrolytes, and preferably to ambient conditions. The membrane is capable of protecting an active metal anode from deleterious reaction with other battery components or ambient conditions and decoupling the chemical environments of the anode and cathode enabling use of anode-incompatible materials, such as solvents and electrolytes, on the cathode side without deleterious impact on the anode, and vice versa. This broadens the array of materials that may be used in active metal electrochemical cells and facilitates cell fabrication while providing a high level of ionic conductivity to enhance performance of an electrochemical cell in which the membrane is incorporated.

The membrane may have any suitable composition, for example, it may be a monolithic material chemically compatible with both the anode and cathode environments, or a composite composed of at least two components of different materials having different chemical compatibilities, one chemically compatible with the anode environment and the other chemically compatible with the cathode environment.

Composite membranes may be composed of at least two components of different materials having different chemical compatibility requirements. The composite may be composed of a laminate of discrete layers of materials having different chemical compatibility requirements, or it may be composed of a gradual transition between layers of the materials. By "chemical compatibility" (or "chemically compatible") it is meant that the referenced material does not react to form a product that is deleterious to battery cell operation when contacted with one or more other referenced battery cell components or manufacturing, handling or storage conditions.

A first material layer of the composite is both ionically conductive and chemically compatible with an active metal electrode material. Chemical compatibility in this aspect of the invention refers to a material that is chemically stable and therefore substantially unreactive when contacted with an active metal electrode material. Active metals are highly reactive in ambient conditions and can benefit from a barrier layer when used as electrodes. They are generally alkali metals such (e.g., lithium, sodium or potassium), alkaline earth metals (e.g., calcium or magnesium), and/or certain transitional metals (e.g., zinc), and/or alloys of two or more of these. The following active metals may be used: alkali metals (e.g., Li, Na, K), alkaline earth metals (e.g., Ca, Mg, Ba), or binary or ternary alkali metal alloys with Ca, Mg, Sn, Ag, Zn, Bi, Al, Cd, Ga, In. Preferred alloys include lithium aluminum alloys, lithium silicon alloys, lithium tin alloys, lithium silver alloys, and sodium lead alloys (e.g., $Na_4Pb$). A preferred active metal electrode is composed of lithium. Chemical compatibility also refers to a material that may be chemically stable with oxidizing materials and reactive when contacted with an active metal electrode material to produce a product that is chemically stable against the active metal electrode material and has the desirable ionic conductivity (i.e., a first layer material). Such a reactive material is sometimes referred to as a "precursor" material.

A second material layer of the composite is substantially impervious, ionically conductive and chemically compatible with the first material. By substantially impervious it is meant that the material provides a sufficient barrier to battery electrolytes and solvents and other battery component materials that would be damaging to the electrode material to prevent any such damage that would degrade electrode performance from occurring. Thus, it should be non-swellable and free of pores, defects, and any pathways allowing air, moisture, electrolyte, etc. to penetrate though it to the first material. Preferably, the second material layer is so impervious to ambient moisture, carbon dioxide, oxygen, etc. that an encapsulated lithium alloy electrode can be handled under ambient conditions without the need for elaborate dry box conditions as typically employed to process other lithium electrodes. Because the composite protective layer described herein provides such good protection for the lithium (or other active metal), it is contemplated that electrodes and electrode/electrolyte composites of this invention may have a quite long shelf life outside of a battery. Thus, the invention contemplates not only batteries containing a negative electrode, but unused negative electrodes and electrode/electrolyte laminates themselves. Such negative electrodes and electrode/electrolyte laminates may be provided in the form of sheets, rolls, stacks, etc. Ultimately, they may be integrated with other battery components to fabricate a battery. The enhanced stability of the batteries of this invention will greatly simplify this fabrication procedure.

In addition to the protective composite laminate structure described above, a protective composite in accordance with the present invention may alternatively be a functionally graded layer, as further described below.

It should be noted that the first and second materials are inherently ionically conductive. That is, they do not depend on the presence of a liquid electrolyte or other agent for their ionically conductive properties.

Additional layers are possible to achieve these aims, or otherwise enhance electrode stability or performance. All layers of the composite have high ionic conductivity, at least $10^{-7}$ S/cm, generally at least $10^{-6}$ S/cm, for example at least $10^{-5}$ S/cm to $10^{-4}$ S/cm, and as high as $10^{-3}$ S/cm or higher so that the overall ionic conductivity of the multi-layer protective structure is at least $10^{-7}$ S/cm and as high as $10^{-3}$ S/cm or higher.

Protective Membranes and Structures

FIG. 1 illustrates an ionically conductive protective membrane in accordance with the present invention in context as it would be used in an active metal battery cell 120, such as a lithium-sulfur battery, in accordance with the present invention. The membrane 100 is both ionically conductive and chemically compatible with an active metal (e.g., lithium) electrode (anode) 106 on one side, and substantially impervious, ionically conductive and chemically compatible with an electrolyte 110 and/or cathode 112 on the other side. The ionic conductivity of the membrane is at least $10^{-7}$ S/cm, generally at least $10^{-6}$ S/cm, for example at least $10^{-5}$ S/cm to $10^{-4}$ S/cm, and as high as $10^{-3}$ S/cm or higher. The active metal anode 106 in contact with the first side of the protective membrane is connected with a current collector 108 composed of a conductive metal, such as copper, that is generally inert to and does not alloy with the active metal. The other side of the membrane 100, is (optionally) in contact with an electrolyte 110. Alternatively, in some embodiments, the protective membrane 100 may itself be the sole electrolyte of the battery cell. Adjacent to the electrolyte is the cathode 112 with its current collector 114.

The protective membrane may be a composite composed of two or more materials that present sides having different chemical compatibility to the anode and electrolyte and/or cathode, respectively. The composite is composed of a first layer of a material that is both ionically conductive and chemically compatible with an active metal electrode material. The composite also includes second layer of a material that is substantially impervious, ionically conductive and chemically compatible with the first material and the cathode/electrolyte environment.

As described further below, given the protection afforded by the protective membranes of the present invention, the electrolytes and/or cathodes combined with the protected anodes of the present invention may include a wide variety of materials including, but not limited to, those described in the patents of PolyPlus Battery Company, referenced herein below.

Figures 2A, 2B:
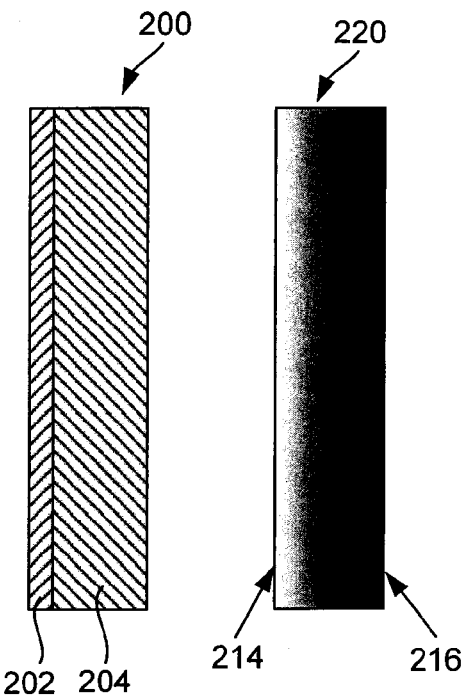
FIGS. 2A and B are schematic illustrations of ionically conductive protective membrane battery separators in accordance with the present invention.

FIG. 2A illustrates a protective membrane composite battery separator in accordance with one embodiment of the present invention. The separator 200 includes a laminate of discrete layers of materials with different chemical compatibilities. A layer of a first material or precursor 202 is ionically conductive and chemically compatible with an active metal. In most cases, the first material is not chemically compatible with oxidizing materials (e.g., air, moisture, etc). The first layer, in contact with the active metal, may be composed, in whole or in part, of active metal nitrides, active metal phosphides, active metal halides or active metal phosphorus oxynitride-based glasses. Specific examples include $Li_3N$, $Li_3P$, LiI, LiBr, LiCl and LiF. In at least one instance, LiPON, the first material is chemically compatible with oxidizing materials. The thickness of the first material layer is preferably about 0.1 to 5 microns, or 0.2 to 1 micron, for example about 0.25 micron.

As noted above, the first material may also be a precursor material which is chemically compatible with an active metal and reactive when contacted with an active metal electrode material to produce a product that is chemically stable against the active metal electrode material and has the desirable ionic conductivity (i.e., a first layer material). Examples of suitable precursor materials include metal nitrides, red phosphorus, nitrogen and phosphorus containing organics (e.g., amines, phosphines, borazine ($B_3N_3H_6$), triazine ($C_3N_3H_3$)) and halides. Some specific examples include P (red phosphorus), $Cu_3N$, $SnN_x$, $Zn_3N_2$, $FeN_x$, $CoN_x$, aluminum nitride (AlN), silicon nitride ($Si_3N_4$) and $I_2$, $Br_2$, $Cl_2$ and $F_2$. Such precursor materials can subsequently react with active metal (e.g., Li) to form Li metal salts, such as the lithium nitrides, phosphides and halides described above. In some instances, these first layer material precursors may also be chemically stable in air (including moisture and other materials normally present in ambient atmosphere), thus facilitating handling and fabrication. Examples include metal nitrides, for example $Cu_3N$.

Also, a suitable active metal compatible layer may include a polymer component to enhance its properties. For example, polymer-iodine complexes like poly(2-vinylpyridine)-iodine (P2VP-$I_2$), polyethylene-iodine, or with tetraalkylammonium-iodine complexes can react with Li to form a LiI-based film having significantly higher ionic conductivity than that for pure LiI.

The ionic conductivity of the first material is high, at least $10^{-7}$ S/cm, generally at least about $10^{-5}$ S/cm, and may be as high as $10^{-3}$ S/cm or higher.

Adjacent to the first material or precursor layer 202 is a second layer 204 that is substantially impervious, ionically conductive and chemically compatible with the first material or precursor, including glassy or amorphous metal ion conductors, such as a phosphorus-based glass, oxide-based glass, phosphorus-oxynitride-based glass, sulfur-based glass, oxide/sulfide based glass, selenide based glass, gallium based glass, germanium-based glass or boracite glass (such as are described D. P. Button et al., Solid State Ionics, Vols. 9-10, Part 1, 585-592 (December 1983); ceramic active metal ion conductors, such as lithium beta-alumina, sodium beta-alumina, Li superionic conductor (LISICON), Na superionic conductor (NASICON), and the like; or glass-ceramic active metal ion conductors. Specific examples include LiPON, $Li_3PO_4.Li_2S.SiS_2$, $Li_2S.GeS_2.Ga_2S_3$, $Li_2O.11Al_2O_3$, $Na_2O.11Al_2O_3$, (Na, Li)$_{1+x}$Ti$_{2-x}$Al$_x$(PO$_4$)$_3$ (0.6≤x≤0.9) and crystallographically related structures, $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, $Li_5ZrP_3O_{12}$, $Li_5TiP_3O_{12}$, $Li_3Fe_2P_3O_{12}$ and $Li_4NbP_3O_{12}$, and combinations thereof, optionally sintered or melted. Suitable ceramic ion active metal ion conductors are described, for example, in U.S. Pat. No. 4,985,317 to Adachi et al., incorporated by reference herein in its entirety and for all purposes.

A particularly suitable glass-ceramic material for the second layer of the protective composite is a lithium ion conductive glass-ceramic having the following composition:

| Composition | mol % |
| --- | --- |
| $P_2O_5$ | 26-55% |
| $SiO_2$ | 0-15% |
| $GeO_2 + TiO_2$ | 25-50% |
| in which   $GeO_2$ | 0-50% |
| $TiO_2$ | 0-50% |
| $ZrO_2$ | 0-10% |
| $M_2O_3$ | 0-10% |
| $Al_2O_3$ | 0-15% |
| $Ga_2O_3$ | 0-15% |
| $Li_2O$ | 3-25% | and containing a predominant crystalline phase composed of $Li_{1+x}(M,Al,Ga)_x(Ge_{1-y}Ti_y)_{2-x}(PO_4)_3$ where X≤0.8 and 0≤Y≤1.0, and where M is an element selected from the group consisting of Nd, Sm, Eu, Gd, Tb, Dy, Ho, Er, Tm and Yb and/or $Li_{1+x+y}Q_xTi_{2-x}Si_yP_{3-y}O_{12}$ where 0<X≤0.4 and 0<Y≤0.6, and where Q is Al or Ga. The glass-ceramics are obtained by melting raw materials to a melt, casting the melt to a glass and subjecting the glass to a heat treatment. Such materials are available from OHARA Corporation, Japan and are further described in U.S. Pat. Nos. 5,702,995, 6,030,909, 6,315,881 and 6,485,622, incorporated herein by reference.

The high conductivity of some of these glasses, ceramics and glass-ceramics (ionic conductivity in the range of about $10^{-5}$ to $10^{-3}$ S/cm or greater) may enhance performance of the protected lithium anode, and allow relatively thick films to be deposited without a large penalty in terms of ohmic resistance.

Also, for solid state applications, a suitable second layer may include a polymer component to enhance its properties. For example, a glass-ceramic active metal ion conductor, like the glass-ceramic materials described above, may also be combined with polymer electrolytes to form flexible composite sheets of material which may be used as second layer of the protective composite. One important example of such a flexible composite material has been developed by OHARA Corp. (Japan). It is composed of particles of a Li-ion conducting glass-ceramic material, such as described above, and a solid polymer electrolyte based on PEO-Li salt complexes. OHARA Corp. manufactures this material in the form of sheet with a thickness of about 50 microns that renders it flexible while maintaining its high ionic conductivity. Because of its relatively high ionic conductivity (better than 4*$10^{-5}$ S/cm at room temperature in the case of the OHARA product) and stability toward metallic Li, this type of composite electrolyte can be used at room temperature or elevated temperatures in fully solid-state cells.

The composite barrier layer should have an inherently high ionic conductivity. In general, the ionic conductivity of the composite is at least $10^{-7}$ S/cm, generally at least about $10^{-6}$ to $10^{-5}$ S/cm, and may be as high as $10^{-4}$ to $10^{-3}$ S/cm or higher. The thickness of the first precursor material layer should be enough to prevent contact between the second material layer and adjacent materials or layers, in particular, the active metal of the anode with which the separator is to be used. For example, the first material layer may have a thickness of about 0.1 to 5 microns; 0.2 to 1 micron; or about 0.25 micron.

The thickness of the second material layer is preferably about 0.1 to 1000 microns, or, where the ionic conductivity of the second material layer is about $10^{-7}$ S/cm, about 0.25 to 1 micron, or, where the ionic conductivity of the second material layer is between about $10^{-4}$ about $10^{-3}$ S/cm, about 10 to 1000 microns, preferably between 1 and 500 microns, and more preferably between 10 and 100 microns, for example 20 microns.

When the first material layer is a precursor material chemically stable in air, for example $Cu_3N$ or LiPON, the protective composite battery separator may be handled or stored in normal ambient atmospheric conditions without degradation prior to incorporation into a battery cell. When the separator is incorporated into a battery cell, the precursor layer 202 is contacted with an active metal (e.g., lithium) electrode. The precursor reacts with the active metal to form an ionically conductive material that is chemically compatible with the active metal electrode material. The second layer is contacted with an electrolyte to which a cathode and current collector is or has been applied. Alternatively, the second layer acts as the sole electrolyte in the battery cell. In either case, the combination of the two layers in the protective composite protects the active metal electrode and the electrolyte and/or cathode from deleterious reaction with one another.

In addition to the protective composite laminates described above, a protective composite in accordance with the present invention may alternatively be compositionally and functionally graded, as illustrated in FIG. 2B. Through the use of appropriate deposition technology such as RF sputter deposition, electron beam deposition, thermal spray deposition, and or plasma spray deposition, it is possible to use multiple sources to lay down a graded film. In this way, the discrete interface between layers of distinct composition and functional character is replaced by a gradual transition of from one layer to the other. The result, as with the discrete layer composites described above, is a bi-functionally compatible ionically conductive composite 220 stable on one side 214 to lithium or other active metal (first material), and on the other side 216 substantially impervious and stable to ambient conditions, and ultimately, when incorporated into a battery cell, to the cathode, other battery cell components (second material). In this embodiment, the proportion of the first material to the second material in the composite may vary widely based on ionic conductivity and mechanical strength issues, for example. In many, but not all, embodiments the second material will dominate. For example, suitable ratios of first to second materials may be 1-1000 or 1-500, for example about 1 to 200 where the second material has greater strength and ionic conductivity than the first (e.g., 2000 Å of LiPON and 20-30 microns of OHARA glass-ceramic). The transition between materials may occur over any (e.g., relatively short, long or intermediate) distance in the composite. Other aspects of the invention apply to these graded protective composites substantially as to the discrete-layered laminate protective composites, for example, they may be used in the electrode and cell embodiments, etc.

Figure 3A:
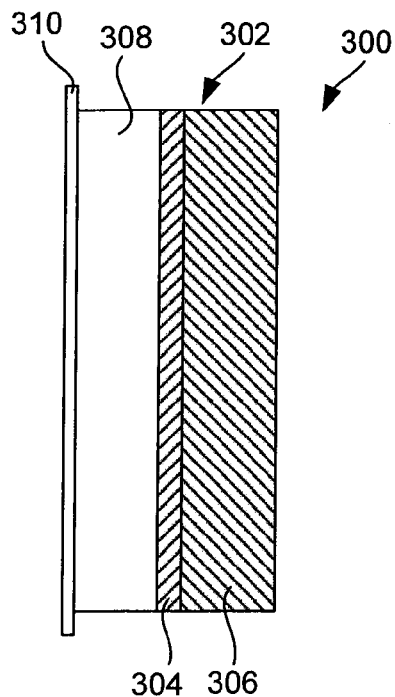
FIG. 3A is a schematic illustration of an active metal anode structure incorporating an ionically conductive protective laminate composite membrane in accordance with the present invention.

FIG. 3A illustrates an encapsulated anode structure incorporating a protective laminate composite in accordance with the present invention. The structure 300 includes an active metal electrode 308, e.g., lithium, bonded with a current collector 310, e.g., copper, and a protective composite 302. The protective composite 302 is composed of a first layer 304 of a material that is both ionically conductive and chemically compatible with an active metal electrode material, but not chemically compatible with oxidizing materials (e.g., air). For example, the first layer, in contact with the active metal, may be composed, in whole or in part, of active metal nitrides, active metal phosphides or active metal halides. Specific examples include $Li_3N$, $Li_3P$, LiI, LiBr, LiCl and LiF. The thickness of the first material layer is preferably about 0.1 to 5 microns, or 0.2 to 1 micron, for example about 0.25 micron.

Active metal electrode materials (e.g., lithium) may be applied to these materials, or they may be formed in situ by contacting precursors such as metal nitrides, metal phosphides, metal halides, red phosphorus, iodine and the like with lithium. The in situ formation of the first layer may be by way of conversion of the precursors to a lithiated analog, for example, according to reactions of the following type (using P, $Cu_3N$, and $PbI_2$ precursors as examples):

1. $3Li+P=Li_3P$ (reaction of the precursor to form Li-ion conductor);
2(a). $3Li+Cu_3N=Li_3N+3\ Cu$ (reaction to form Li-ion conductor/metal composite);
2(b). $2Li+PbI_2=2\ LiI+Pb$ (reaction to form Li-ion conductor/metal composite).

First layer composites, which may include electronically conductive metal particles, formed as a result of in situ conversions meet the requirements of a first layer material for a protective composite in accordance with the present invention and are therefore within the scope of the invention.

A second layer 306 of the protective composite is composed of a substantially impervious, ionically conductive and chemically compatible with the first material or precursor, including glassy or amorphous metal ion conductors, such as a phosphorus-based glass, oxide-based glass, phosphorus-oxynitride-based glass, sulfur-based glass, oxide/sulfide based glass, selenide based glass, gallium based glass, germanium-based glass or boracite glass; ceramic active metal ion conductors, such as lithium beta-alumina, sodium beta-alumina, Li superionic conductor (LISICON), Na superionic conductor (NASICON), and the like; or glass-ceramic active metal ion conductors. Specific examples include LiPON, $Li_3PO_4.Li_2S.SiS_2$, $Li_2S.GeS_2.Ga_2S_3$, $Li_2O.11Al_2O_3$, $Na_2O.11Al_2O_3$, $(Na, Li)_{1+x}Ti_{2-x}Al_x(PO_4)_3$ ($0.6 \leq x \leq 0.9$) and crystallographically related structures, $Na_3Zr_2Si_2O_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, $Li_5ZrP_3O_{12}$, $Li_5TiP_3O_{12}$, $Li_3Fe_2P_3O_{12}$ and $Li_4NbP_3O_{12}$, and combinations thereof, optionally sintered or melted. Suitable ceramic ion active metal ion conductors are described, for example, in U.S. Pat. No. 4,985,317 to Adachi et al., incorporated by reference herein in its entirety and for all purposes. Suitable glass-ceramic ion active metal ion conductors are described, for example, in U.S. Pat. Nos. 5,702,995, 6,030,909, 6,315,881 and 6,485,622, previously incorporated herein by reference and are available from OHARA Corporation, Japan.

The ionic conductivity of the composite is at least $10^{-7}$ S/cm, generally at least $10^{-6}$ S/cm, for example at least $10^{-5}$ S/cm to $10^{-4}$ S/cm, and as high as $10^{-3}$ S/cm or higher. The thickness of the second material layer is preferably about 0.1 to 1000 microns, or, where the ionic conductivity of the second material layer is about $10^{-7}$ S/cm, about 0.25 to 1 micron, or, where the ionic conductivity of the second material layer is between about $10^{-4}$ about $10^{-3}$ S/cm, 10 to 1000 microns, preferably between 1 and 500 micron, and more preferably between 10 and 100 microns, for example 20 microns.

When the anode structure is incorporated in a battery cell, the first layer 304 is adjacent to an active metal (e.g., lithium) anode and the second layer 306 is adjacent to an electrolyte or, where the second layer is the sole electrolyte in the battery cell, a cathode.

Either layer may also include additional components. For instance, a suitable first active metal compatible layer 304 may include a polymer component to enhance its properties. For example, polymer-iodine complexes like poly(2-vinylpyridine)-iodine (P2VP-$I_2$), polyethylene-iodine, or with tetraalkylammonium-iodine can react with Li to form a LiI-based film having significantly higher ionic conductivity than that for pure LiI. Also, for solid state applications, a suitable second layer 306 may include a polymer component to enhance its properties. For example, a glass-ceramic active metal ion conductor like that available from OHARA Corporation, described above, may be fabricated within a polymer matrix that renders it flexible while maintaining its high ionic conductivity (available from OHARA Corporation, Japan).

In addition, the layers may be formed using a variety of techniques. These include deposition or evaporation (including e-beam evaporation) of layers of material, such as $Li_3N$ or an ionically conductive glass. Also, as noted above, the active metal electrode adjacent layer may be formed in situ from the non-deleterious reaction of one or more precursors with the active metal electrode. For example, a $Li_3N$ layer may be formed on a Li anode by contacting $Cu_3N$ with the Li anode surface, or Li$_3$P may be formed on a Li anode by contacting red phosphorus with the Li anode surface.

Figure 3B:
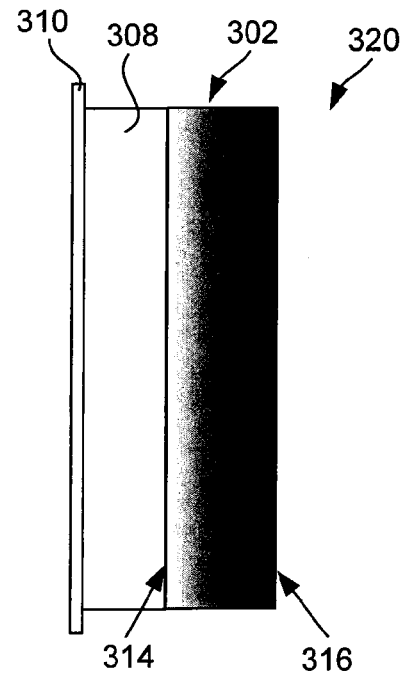
FIG. 3B is a schematic illustration of an active metal anode structure incorporating an ionically conductive protective graded composite membrane in accordance with the present invention.

As noted above with regard to the protective membrane separator structures described in connection with FIGS. 2A and B, in addition to the protective composite laminates described above, a protective composite in accordance with the present invention may alternatively be compositionally and functionally graded, as illustrated in FIG. 3B. Through the use of appropriate deposition technology such as RF sputter deposition, electron beam deposition, thermal spray deposition, and or plasma spray deposition, it is possible to use multiple sources to lay down a graded film. In this way, the discrete interface between layers of distinct composition and functional character is replaced by a gradual transition of from one layer to the other. The result, as with the discrete layer composites described above, is a bi-functionally compatible ionically conductive composite 320 stable on one side 314 to lithium or other active metal (first material), and on the other side 316 substantially impervious and stable to the cathode, other battery cell components and preferably to ambient conditions (second material).

As noted with reference to the graded separator in FIG. 2B, in this embodiment the proportion of the first material to the second material in the composite may vary widely based on ionic conductivity and mechanical strength issues, for example. In many, but not all, embodiments the second material will dominate. For example, suitable ratios of first to second materials may be 1-1000 or 1-500, for example about 1 to 200 where the second material has greater strength and ionic conductivity than the first (e.g., 2000 Å of LiPON and 20-30 microns of OHARA glass-ceramic). The transition between materials may occur over any (e.g., relatively short, long or intermediate) distance in the composite.

Also, an approach may be used where a first material and second material are coated with another material such as a transient and/or wetting layer. For example, an OHARA glass ceramic plate is coated with a LiPON layer, followed by a thin silver (Ag) coating. When lithium is evaporated onto this structure, the Ag is converted to Ag—Li and diffuses, at least in part, into the greater mass of deposited lithium, and a protected lithium electrode is created. The thin Ag coating prevents the hot (vapor phase) lithium from contacting and adversely react with the LiPON first material layer. After deposition, the solid phase lithium is stable against the LiPON. A multitude of such transient/wetting (e.g., Sn) and first layer material combinations can be used to achieve the desired result.

Thus, the invention encompasses protected anode structures with fully-formed protective layers and battery separators incorporating ambient stable precursors, each of which may be handled or stored in normal ambient atmospheric conditions without degradation prior to incorporation into a battery cell. Battery cells and methods for making separators, anode structures and battery cells are also provided.

Battery Cells

Protected active metal anodes as described herein may be incorporated into a variety of battery cell structures. These includes fully solid state battery cells and battery cells with gel and liquid electrolyte systems, including, but not limited to, those described in the patents of PolyPlus Battery Company, referenced herein.

Solid and Gel State Batteries

A solid state battery cell in accordance with the present invention may include a protected anode as described herein against a polymer electrolyte such as polyethylene oxide (PEO), and a PEO/carbon/metal-oxide type cathode.

Alternatively, gel-state electrolytes in which non-aqueous solvents have been gelled through the use of a gelling agent such as polyacrylonitrile (PAN), polyethylene oxide (PEO), polyvinylidene fluoride (PVDF), or polymerizable monomers that are added to the non-aqueous solvent system and polymerized in situ by the use of heat or radiation may be used.

Examples of suitable solid and gel state electrolytes and batteries incorporating them are described, for example, in U.S. Pat. No. 6,376,123, issued Apr. 23, 2002 and titled RECHARGEABLE POSITIVE ELECTRODES, assigned to PolyPlus Battery Company, the assignee of the present application, which is incorporated herein by reference in its entirety and for all purposes.

Liquid Electrolytes

One of the main requirements of the liquid electrolyte system for all Li-metal and Li-ion battery cells is its compatibility with the anode material. The liquid electrolytes of existing Li-metal and Li-ion cells are not thermodynamically stable toward Li metal, Li alloys, and Li—C compounds, but rather kinetically stable due to formation of a solid electrolyte interface (SEI) protecting the anode surface from a continuous reaction with components of the electrolyte. Therefore, only a very limited spectrum of aprotic solvents and supporting salts is suitable for use in Li-metal and Li-ion batteries with an unprotected anode. In particular, the binary, ternary or multicomponent mixtures of alkyl carbonates or their mixtures with ethers are used as solvents, and LiPF$_6$ is generally used as a supporting salt in electrolytes for Li-ion batteries.

The main component of these solvent mixtures is ethylene carbonate (EC). It has been shown that without the presence of EC in the electrolyte, the SEI formed does not provide enough protection for anode surface, and cell's cyclability is very poor. However, EC has a high melting point of 35° C. and a high viscosity that limits the rate capability and the cell's low temperature performance. Another important disadvantage of existing Li-ion batteries is the irreversible capacity loss during the first charge associated with in situ formation of the SEI.

Protection of the anode with an ionically conductive protective membrane in accordance with the present invention allows for use of a very wide spectrum of solvents and supporting salts in rechargeable and primary batteries with Li metal anodes. The protected anode is completely decoupled from the electrolyte, so electrolyte compatibility with the anode is no longer an issue; solvents and salts which are not kinetically stable to Li can be used. Improved performance can be obtained with conventional liquid electrolytes, as noted above and as described, for example, in U.S. Pat. No. 6,376,123, previously incorporated herein by reference. Moreover, the electrolyte solution can be composed of only low viscosity solvents, such as ethers like 1,2-dimethoxy ethane (DME), tetrahydrofuran (THF), 2-methyltetrahydrofuran, 1,3-dioxolane (DIOX), 4-methyldioxolane (4-Me-DIOX) or organic carbonates like dimethylcarbonate (DMC), ethylmethylcarbonate (EMC), diethylcarbonate (DEC), or their mixtures. Also, super low viscosity ester solvents or co-solvents such as methyl formate and methyl acetate, which are very reactive to unprotected Li, can be used. As is known to those skilled in the art, ionic conductivity and diffusion rates are inversely proportional to viscosity such that all other things being equal, battery performance improves as the viscosity of the solvent decreases. The use of such electrolyte solvent systems significantly improves battery performance, in particular discharge and charge characteristics at low temperatures.

Ionic Liquids

Ionic liquids are organic salts with melting points under 100 degrees, often even lower than room temperature. The most common ionic liquids are imidazolium and pyridinium derivatives, but also phosphonium or tetralkylammonium compounds are also known. Ionic liquids have the desirable attributes of high ionic conductivity, high thermal stability, no measurable vapor pressure, and non-flammability. Representative ionic liquids are 1-Ethyl-3-methylimidazolium tosylate (EMIM-Ts), 1-Butyl-3-methylimidazolium octyl sulfate (BMIM-OctSO$_4$), 1-Ethyl-3-methylimidazolium hexafluorophosphate, and 1-Hexyl-3-methylimidazolium tetrafluoroborate. Although there has been substantial interest in ionic liquids for electrochemical applications such as capacitors and batteries, they are unstable to metallic lithium and lithiated carbon. However, protected lithium anodes as described in this invention are isolated from direct chemical reaction, and consequently lithium metal batteries using ionic liquids can be developed as an embodiment of the present invention. Such batteries should be particularly stable at elevated temperatures.

Cathodes

Another important advantage associated with the use of ionically conductive protective membranes in accordance with the present invention in battery cells is that both lithiated intercalation compounds and unlithiated intercalation compounds can be used as cathode materials. As a result, protection of the anode with ionically conductive composite materials allows for use of a variety of 2, 3, 4 and 5 V cathodes suitable for fabrication of primary and rechargeable batteries for a wide range of applications. Examples of lithiated metal oxide based cathodes suitable for rechargeable cells with protected Li anodes in accordance with the present invention include: $Li_xCoO_2$, $Li_xNiO_2$, $Li_xMn_2O_4$ and $LiFePO_4$. Examples of unlithiated metal oxide or sulfide based cathodes suitable for use both for primary and rechargeable cells with protected Li anodes in accordance with the present invention include: $AgxV_2O_5$, $CuxV_2O_5$, $V_2O_5$, $V_6O_{13}$, $FeS_2$ and $TiS_2$. Examples of metal oxide based cathodes suitable for primary cells with protected Li anodes in accordance with the present invention include: $MnO_2$, $CuO$, $Ag_2CrO_4$ and $MoO_3$. Examples of metal sulfide based positive electrodes for primary cells with protected Li anodes in accordance with the present invention include: CuS and FeS.

In addition, active sulfur cathodes including elemental sulfur and polysulfides, as described in the patents of PolyPlus Battery Company cited and incorporated by reference below are suitable cathodes for protected lithium metal anode battery cells in accordance with the present invention.

Fabrication Techniques

Materials and techniques for fabrication of active metal battery cells are described, for example, in U.S. Pat. Nos. 5,686,201 and 6,376,123 issued to Chu on Nov. 11, 1997. Further description of materials and techniques for fabrication of active metal battery cells having anode protective layers are described, for example, in U.S. patent application Ser. No. 09/139,601, filed Aug. 25, 1998 (now U.S. Pat. No. 6,214,061, issued Apr. 10, 2001), titled ENCAPSULATED LITHIUM ALLOY ELECTRODES HAVING BARRIER LAYERS, and naming May-Ying Chu, Steven J. Visco and Lutgard C. DeJonge as inventors; U.S. patent application Ser. No. 09/086,665 filed May 29, 1998 (now U.S. Pat. No. 6,025,094, issued May 15, 2000), titled PROTECTIVE COATINGS FOR NEGATIVE ELECTRODES, and naming Steven J. Visco and May-Ying Chu as inventors; U.S. patent application Ser. No. 09/139,603 filed Aug. 25, 1998 (now U.S. Pat. No. 6,402,795, issued Jun. 11, 2002), titled "PLATING METAL NEGATIVE ELECTRODES UNDER PROTECTIVE COATINGS," and naming May-Ying Chu, Steven J. Visco and Lutgard C. DeJonghe as inventors; U.S. patent application Ser. No. 09/139,601 filed Aug. 25, 1998 (now U.S. Pat. No. 6,214,061, issued Apr. 10, 2001), titled "METHOD FOR FORMING ENCAPSULATED LITHIUM ELECTRODES HAVING GLASS PROTECTIVE LAYERS," and naming Steven J. Visco and Floris Y. Tsang as inventors. The active metal electrode may also be an active metal alloy electrode, as further described in U.S. patent application Ser. No. 10/189,908 filed Jul. 3, 2002 (now U.S. Pat. No. 6,991,662, issued Jan. 31, 2006), titled "ENCAPSULATED ALLOY ELECTRODES," and naming Steven J. Visco, Yevgeniy S. Nimon and Bruce D. Katz as inventors. The battery component materials, including anodes, cathodes, separators, protective layers, etc., and techniques disclosed therein are generally applicable to the present invention and each of these patent applications is incorporated herein by reference in its entirety for all purposes.

In particular, a protective membrane in accordance with the present invention may be formed using a variety of methods. These include deposition or evaporation. Protective membrane composites of the present invention may be formed by deposition or evaporation (including e-beam evaporation) of the first layer of material or precursor on the second layer of material. Also, as noted above and described further below, the first layer may be formed in situ from the non-deleterious reaction of one or more precursors with an active metal electrode or material, by deposition or evaporation of lithium on the precursor, by direct contact of the precursor with a lithium metal (e.g., foil), or by plating of the precursor with lithium through a second layer material. In some embodiments, the second layer material may also be formed on the first layer material, as described further below.

Figure 4A:
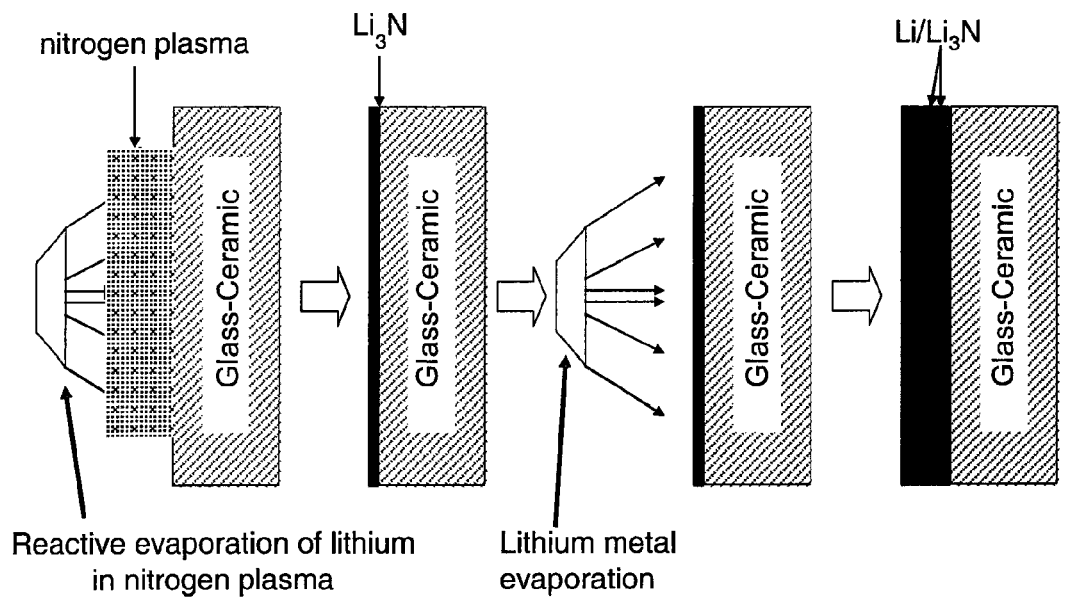
FIGS. 4A-B, 5 and 6A-B are schematic illustrations of alternative methods of making an electrochemical device structure incorporating an ionically conductive protective membrane in accordance with the present invention.

Referring to FIG. 4A, a first method for forming a protective membrane composite in accordance with the present invention is shown. A first layer, that is a highly ionically conductive active metal chemically compatible material, is directly deposited onto a second layer material, that is a substantially impervious, ionically conductive material, for example, a highly ionically conductive glass or glass-ceramic material such as LiPON or an OHARA glass-ceramic material described above. This can be done by a variety of techniques including RF sputtering, e-beam evaporation, thermal evaporation, or reactive thermal or e-beam evaporation, for example. In the particular example illustrated in the figure, lithium is evaporated in a nitrogen plasma to form a lithium nitride ($Li_3N$) layer on the surface of a glass-ceramic material such as the OHARA material described above. This is followed by evaporation of lithium metal onto the $Li_3N$ film. The $Li_3N$ layer separates the lithium metal electrode from the second material layer, but allows Li ions to pass from the Li electrode through the glass. Of course, other active metal, and first and second layer materials, as described herein, may be used as well.

Figure 4B:
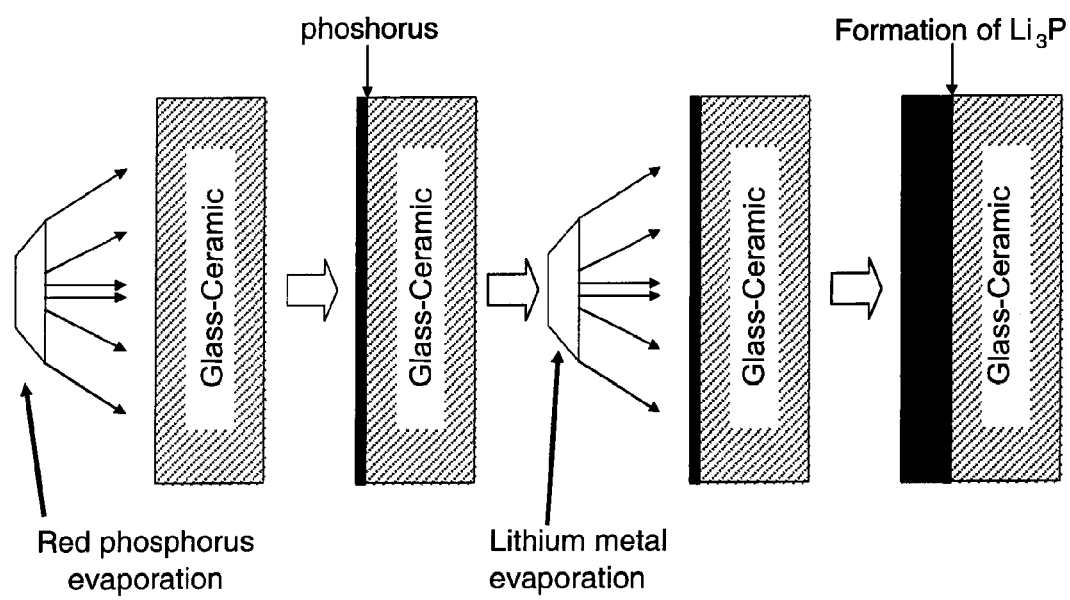

Alternatively, referring to FIG. 4B, a second method for forming a protective membrane composite in accordance with the present invention is shown. The ionically conductive chemically compatible first layer material is formed in situ following formation of a precursor layer on the second layer material. In the particular example illustrated in the figure, a surface of a glass-ceramic layer, for example one composed of the OHARA material described above, is coated with red phosphorus, a precursor for an active metal (in this case lithium) phosphide. Then a layer of lithium metal is deposited onto the phosphorus. The reaction of lithium and phosphorus forms $Li_3P$ according to the following reaction: $3Li+P=Li_3P$.

Li$_3$P is an ionically conductive material that is chemically compatible with both the lithium anode and the glass-ceramic material. In this way, the glass-ceramic (or other second layer material) is not in direct contact with the lithium electrode. Of course, other active metal, first layer precursor and second layer materials, as described herein, may be used as well. Alternative precursor examples include CuN$_3$, which may be formed as a thin layer on a second layer material (e.g., glass-ceramic) and contacted with a Li anode in a similar manner according to the following reaction: 3Li+Cu$_3$N=Li$_3$N+3 Cu; or lead iodide which may be formed as a thin layer on a polymer electrolyte and contacted with a Li anode in a similar manner according to the following reaction: 2Li+PbI$_2$=2 LiI+Pb.

Figure 5:
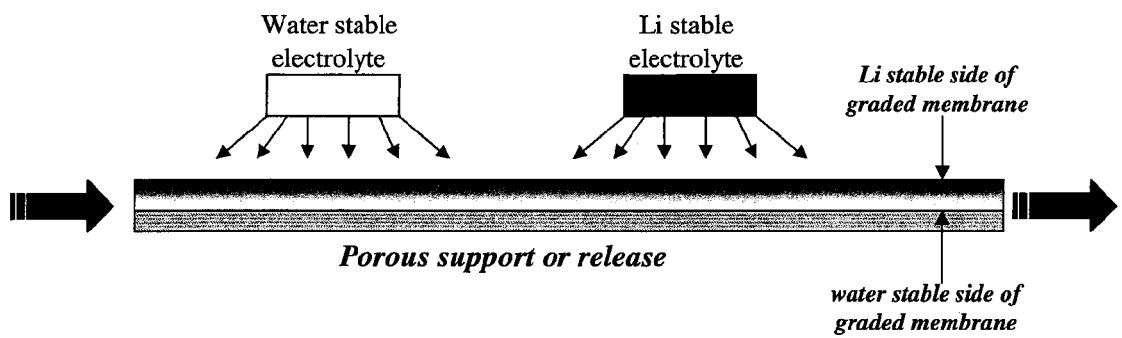

In another alternative, illustrated in FIG. 5, a protective membrane composite in accordance with the present invention may alternatively be compositionally and functionally graded so that there is a gradual transition of from one layer to the other. For example, a plasma spray operation with two spray heads, one for the deposition of a first component material, such as Li$_3$N, Cu$_3$N, Li$_3$P, LiPON, or other appropriate material, and the other for the deposition of a second component material, such as an OHARA glass-ceramic, may be used. The first plasma spray process begins laying down a layer of pure glass-ceramic material, followed by a gradual decrease in flow as the second plasma spray torch is gradually turned on, such that there is a gradient from pure glass-ceramic to a continuous transition from glass-ceramic to pure LiPON or Li$_3$N, etc. In this way, one side of the membrane is stable to active metal (e.g., lithium, sodium, etc.) and the other side is substantially impervious and stable to the cathode, other battery cell components and preferably to ambient conditions. Electron beam deposition or thermal spray deposition may also be used. Given the parameters described herein, one or skill in the art will be able to use any of these techniques to form the graded composites of the invention.

To form a protected anode, lithium is then bonded to the graded membrane on the first layer material (stable to active metal) side of the graded protective composite, for example by evaporation of lithium onto the protective composite as described above. It may also be desirable to add a bonding layer on top of the lithium stable side of the graded composite protective layer, such as Sn, Ag, Al, etc., before applying lithium.

In any of the forgoing methods described with reference to FIGS. 4A-B and 5, rather than forming a lithium (or other active metal) layer on the first layer material or precursor, the first layer material or precursor of the protective composite may be contacted with the lithium by bonding metallic lithium to the protective interlayer material or precursor, for example by direct contact with extruded lithium metal foil.

In a further embodiment, a suitable substrate, e.g., having a wetting layer, such as a film of tin on copper, may be coated with a first layer material precursor, e.g., Cu$_3$N. This may then be coated with a second layer material, e.g., a (ionically) conductive glass. An active metal electrode may then be formed by plating the tin electrode with lithium (or other active metal), through the first and second layer materials. The Cu$_3$N precursor is also converted to Li$_3$N by this operation to complete the protective composite in accordance with the present invention on a lithium metal electrode. Details of an active metal plating process are described in commonly assigned U.S. Pat. No. 6,402,795, previously incorporated by reference.

With regard to the fabrication methods described above it is important to note that commercial lithium foils are typically extruded and have numerous surface defects due to this process, many of which have deep recesses that would be unreachable by line-of-sight deposition techniques such as RF sputter deposition, thermal and E-beam evaporation, etc. Another issue is that active metals such as lithium may be reactive to the thin-film deposition environment leading to further deterioration of the surface during the coating process. This typically leads to gaps and holes in a membrane deposited onto the surface of an active metal electrode. However, by inverting the process, this problem is avoided; lithium is deposited on the protective membrane rather than the protective membrane being deposited on lithium. Glass and glass-ceramic membranes can be made quite smooth either by melt-casting techniques, cut and polish methods, or a variety of known methods leading to smooth surfaces (lithium is a soft metal that cannot be polished). Single or multiple smooth, gap-free membranes may then be deposited onto the smooth surface. After deposition is complete, active metal can be deposited onto the smooth surface by evaporation, resulting is a active meta/protective membrane interface that is smooth and gap-free. Alternatively, a transient bonding layer such as Ag can be deposited onto the protective membrane such that extruded lithium foil can be joined to the membrane by pressing the foil against the Ag layer.

Also as noted above, in an alternative embodiment of the invention the first layer may include additional components. For instance, a suitable first layer may include a polymer component to enhance its properties. For example, polymer-iodine complexes like poly(2-vinylpyridine)-iodine (P2VP-I$_2$), polyethylene-iodine, or tetraalkylammonium-iodine can react with Li to form an ionically conductive LiI-based film that is chemically compatible with both an active metal and a second layer material as described herein. Without intending to be bound by theory, it is expected that the use of polymer-iodine charge transfer complexes can lead to formation of composites containing LiI and polymer and having significantly higher ionic conductivity than that for pure LiI. Other halogens may also be used in this manner, for example in bromine complexes.

Figure 6A:
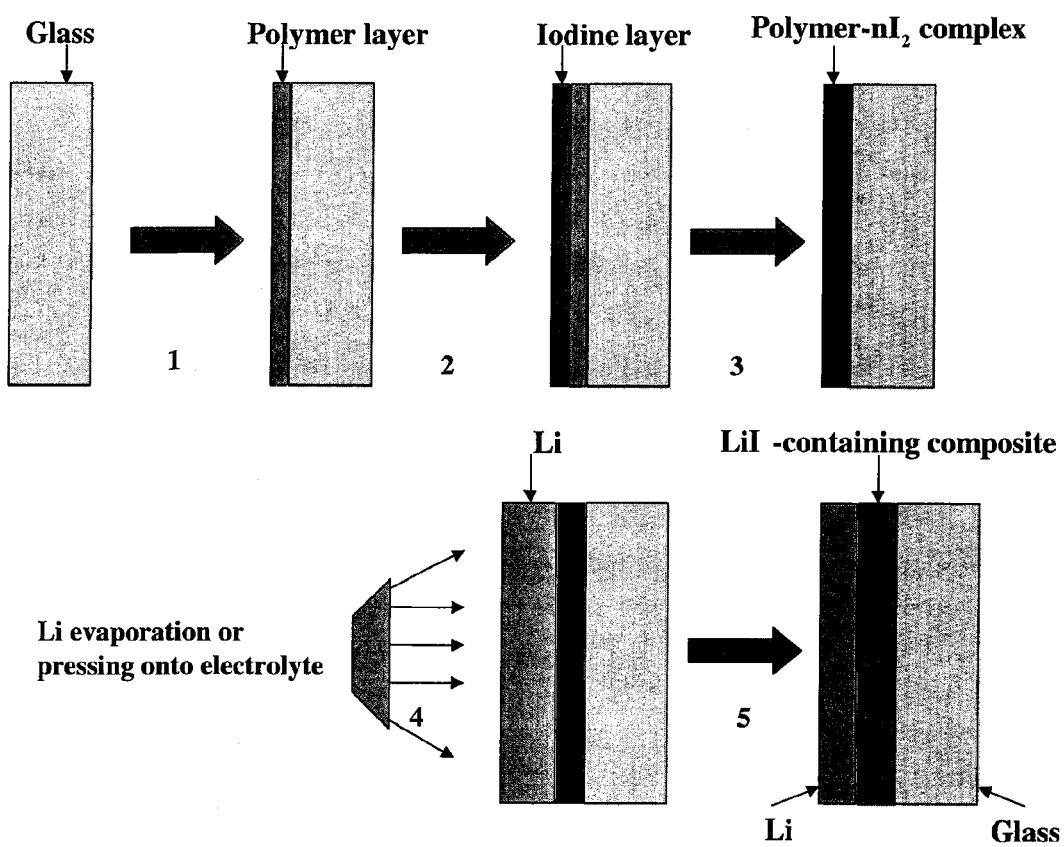

Referring to FIG. 6A, a first embodiment of this aspect of the present invention is shown. A polymer layer and a layer of iodine are coated on a second layer material surface and allowed to react forming polymer-iodine complex.

According to this method, a thin layer of polymer may be applied to the second material layer (e.g., conductive glass) using brushing, dipping, or spraying. For example, a conductive glass layer may be coated with a thin (e.g., 0.5 to 2.0 micron, preferably 0.1 to 0.5 micron) layer of P2VP in this way.

One technique for applying an iodine coating is sublimation of crystalline iodine that can be achieved at room temperature (e.g., about 20 to 25° C.) in a reactor placed in the dry box or in a dry room. A sublimed layer of iodine can be made very thin (e.g., 0.05 to 1.0 microns and the rate of sublimation can be adjusted by varying the temperature or distance between the substrate and source of iodine.

Alternatively, high concentrations (e.g., 50 to 100 g/liter of iodine can be dissolved in an organic solvent, such as acetonitrile and n-heptane. Dissolved iodine can be coated on the conductive glass surface by such methods as dip coating, spraying or brushing, among others. In this case, treatment conditions can be easily changed by varying the length of coating treatment and iodine concentrations. Examples of iodine sources for this technique include metal iodides are AgI and PbI$_2$, which are known to be used as the cathode materials in solid-state batteries with Li anode and LiI-based solid electrolyte.

Then, lithium (or other active metal) is contacted with the polymer-iodine complex on the conductive glass (or other second layer material), for example by evaporation or pressing onto the glass coated with this complex. The result is a LiI-containing composite protective barrier layer on the Li anode.

Figure 6B:
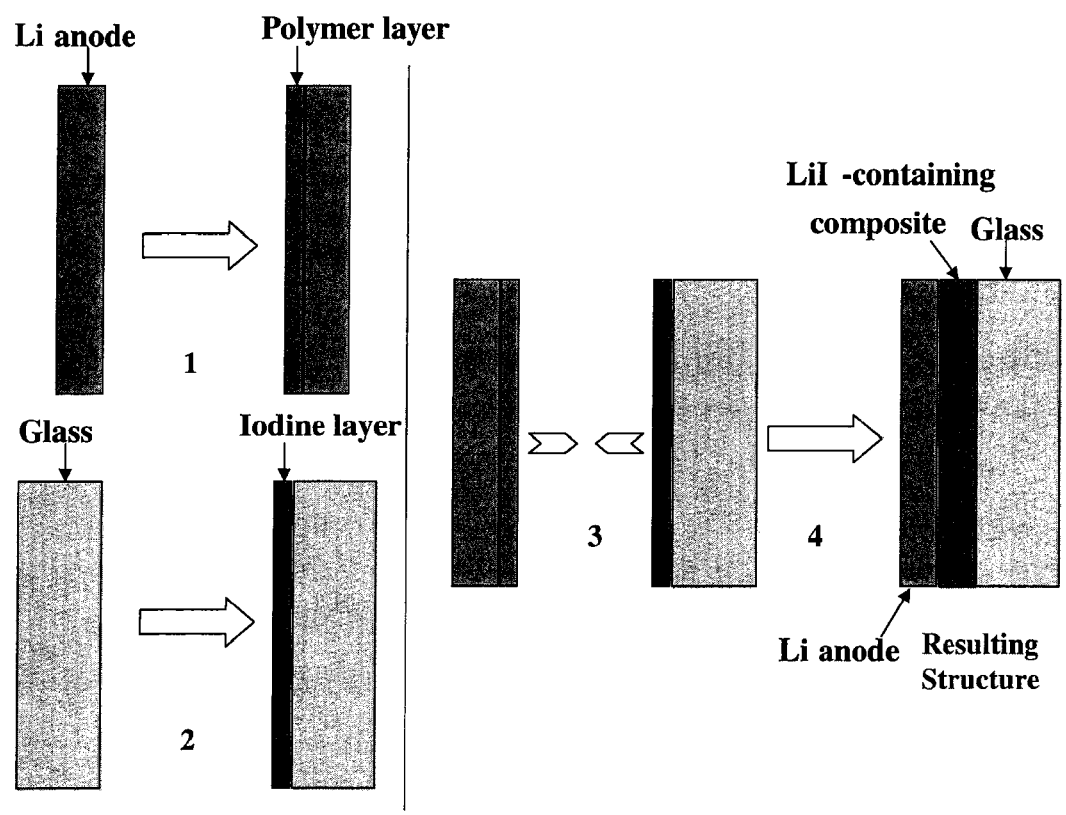

Referring to FIG. 6B, an alternative embodiment of this aspect of the present invention is shown. A conductive glass (or other second layer material) surface is coated with a thin layer of iodine, such as by a technique described above, that can react with Li forming LiI layer (A).

Active metal, for example lithium foil, can be coated with a thin layer of polymer (B), for example as described above, and then contacted with the iodine layer on the glass. After assembly, iodine reacts with the polymer layer and, as a result, LiI-containing composite protective barrier layer with reduced impedance is formed.

EXAMPLES

The following examples provide details illustrating advantageous properties, in particular very low impedance, of composite membrane protective structures in accordance with the present invention on lithium electrodes. These examples are provided to exemplify and more clearly illustrate aspects of the present invention and are in no way intended to be limiting.

Example 1

Impedance Measurements Using LIPON in Composite Protective Layer

Figure 7A:
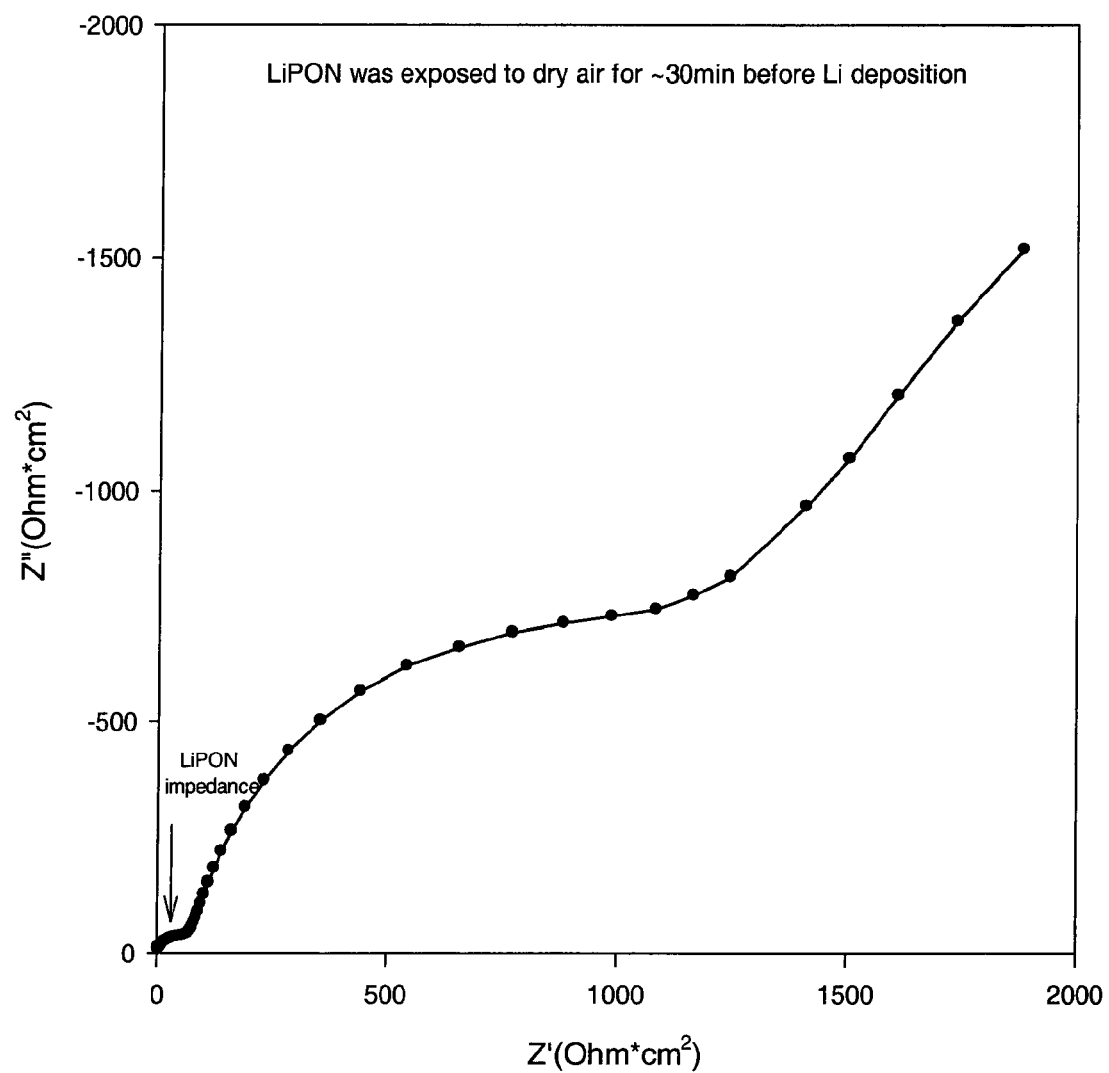
FIGS. 7A-B and 8A-D are plots of data illustrating the performance benefits of ionically conductive protective membranes in accordance with the present invention.
Figure 7B:
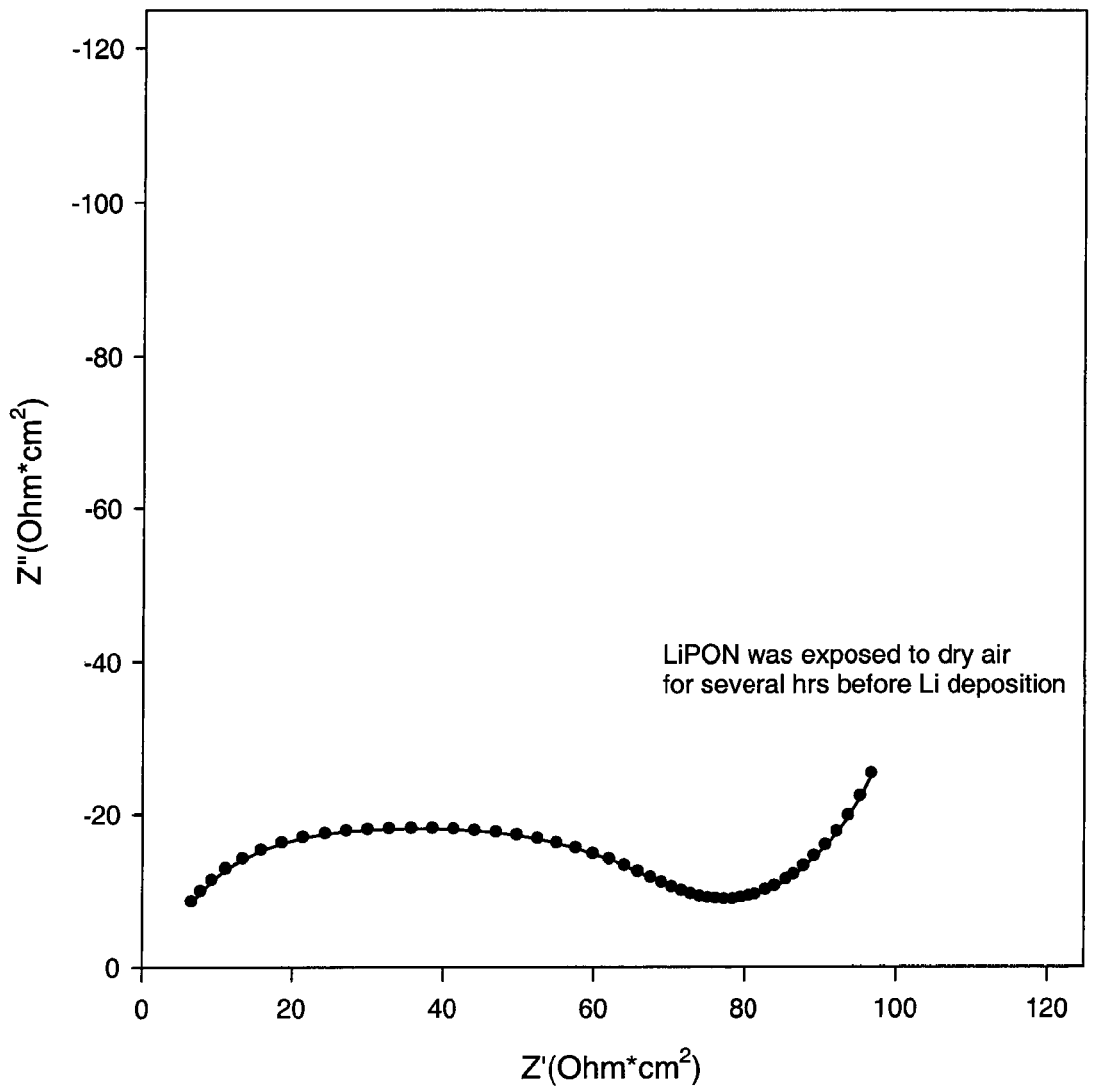

Approximately 0.75 microns of LiPON was RF sputter-deposited onto copper foil samples in a MRC 8671 Sputter Deposition system. Some of the copper foil samples were coated with an additional layer of $Cu_3N$ (approximately 0.9 microns) by RF Magnetron sputtering of a copper target in a nitrogen environment. One LiPON/Cu sample was transferred to a vacuum evaporator, and approximately 3 to 7 microns of lithium metal was evaporated directly onto the LiPON surface. Another $Cu_3N$/LiPON/Cu sample was coated with a similar thickness of lithium. The impedance for the unprotected LiPON/Cu sample is shown in FIG. 7A; the evaporation of lithium onto the LiPON surface led to a dramatic rise in the resistance of the sample, which is undesirable for electrochemical devices. The beneficial effects of the protective $Cu_3N$ film can be seen in FIG. 7B; the impedance is dramatically lower in this case.

Example 2

Figure 8A:
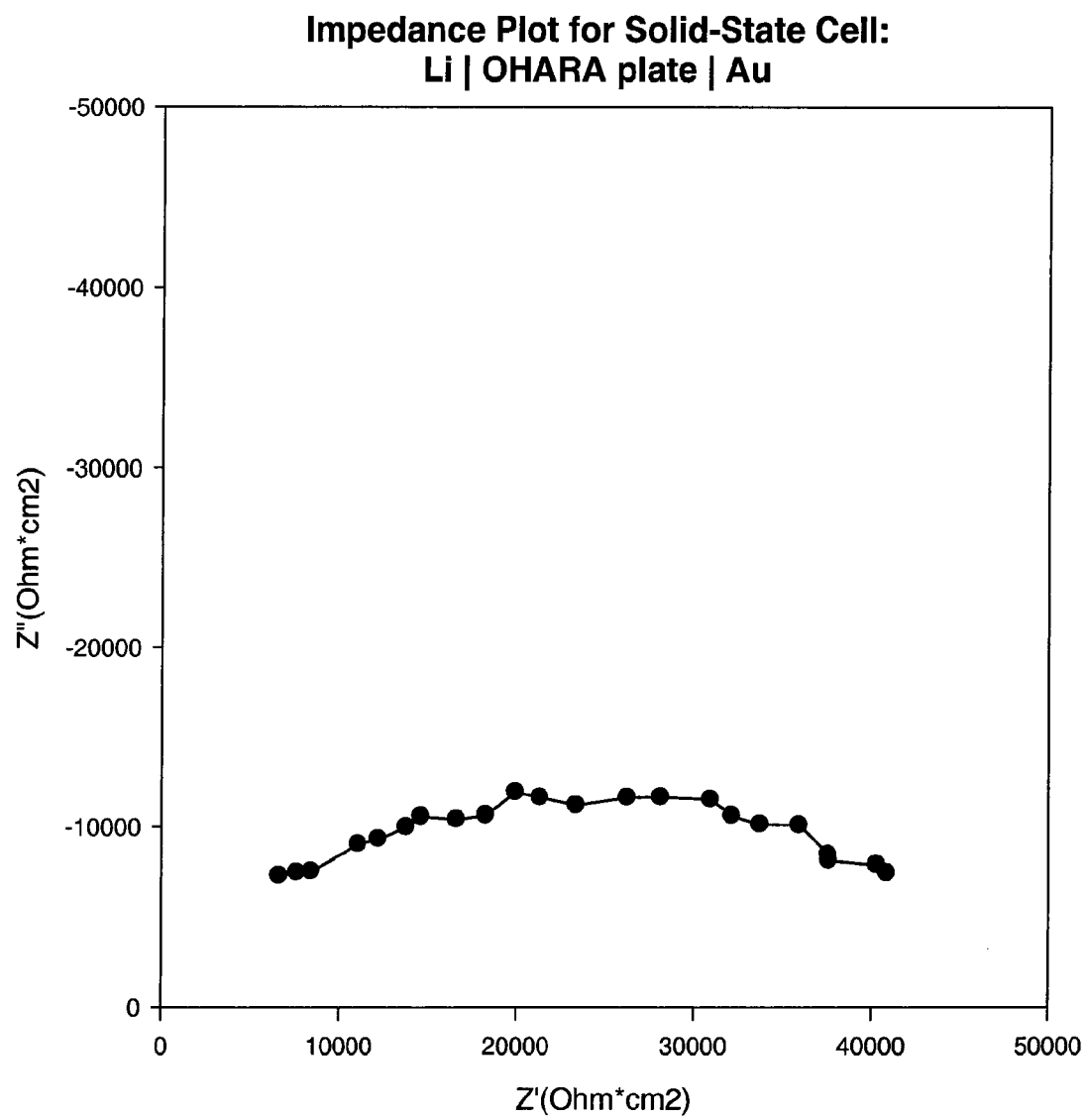
Figure 8B:
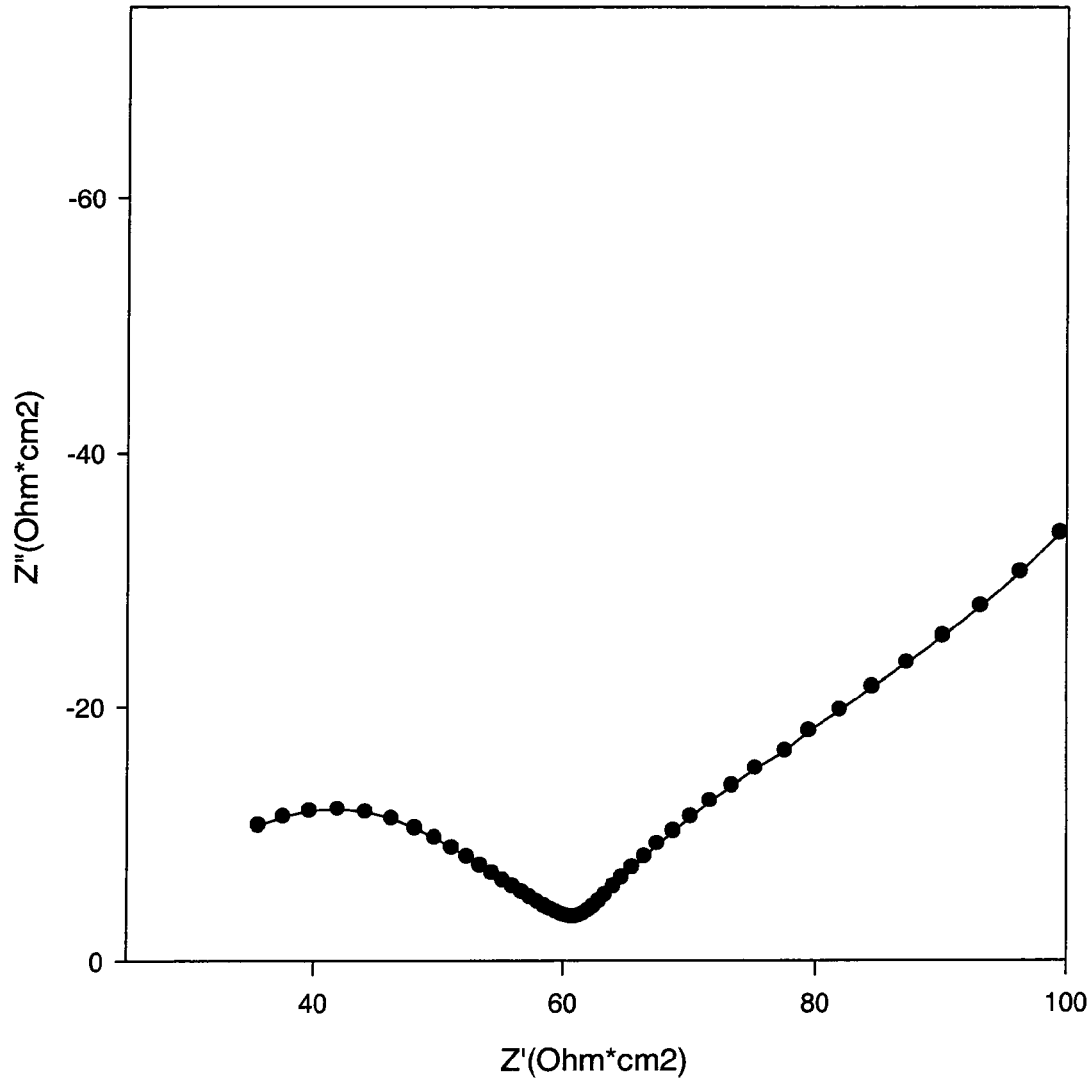
Figure 8C:
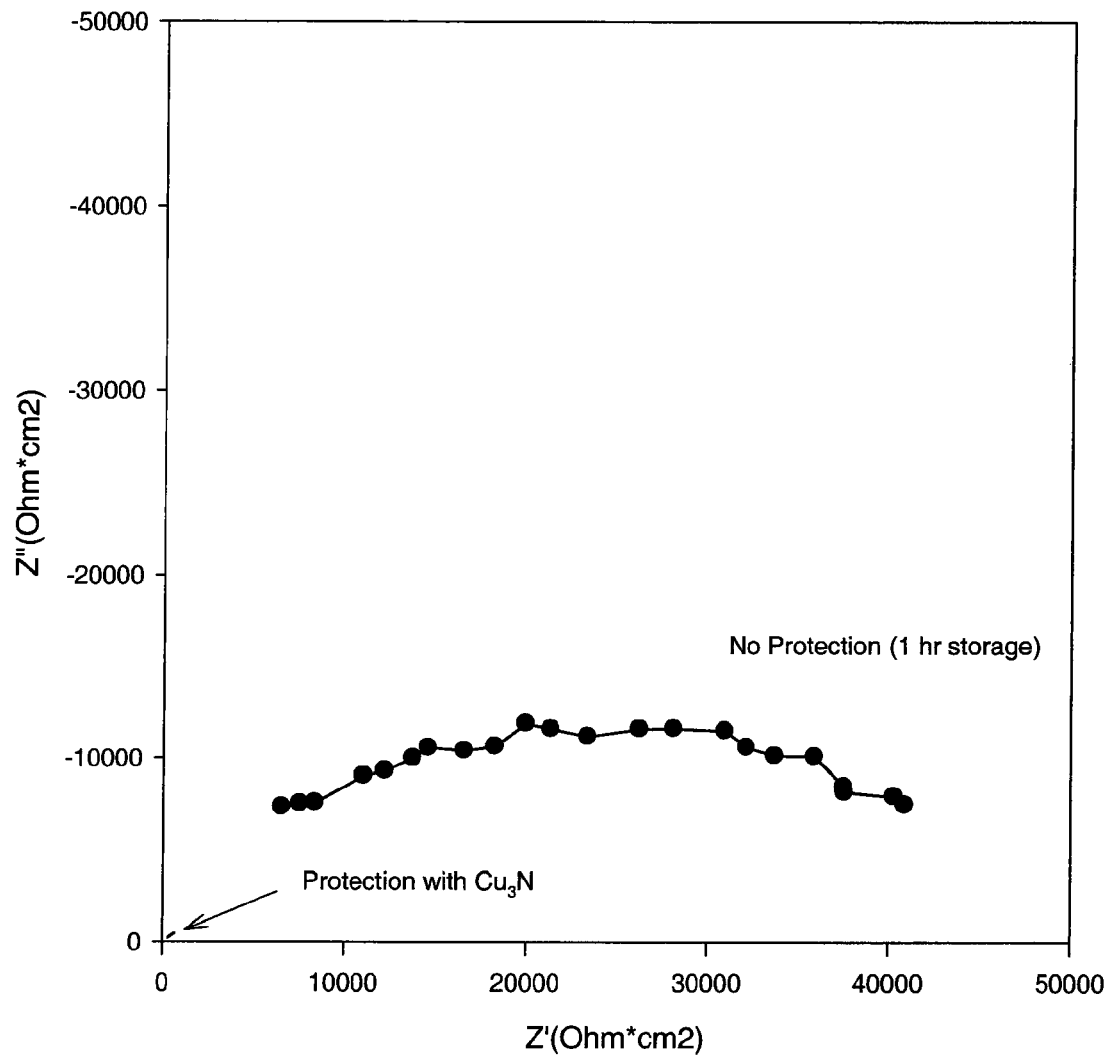
Figure 8D:
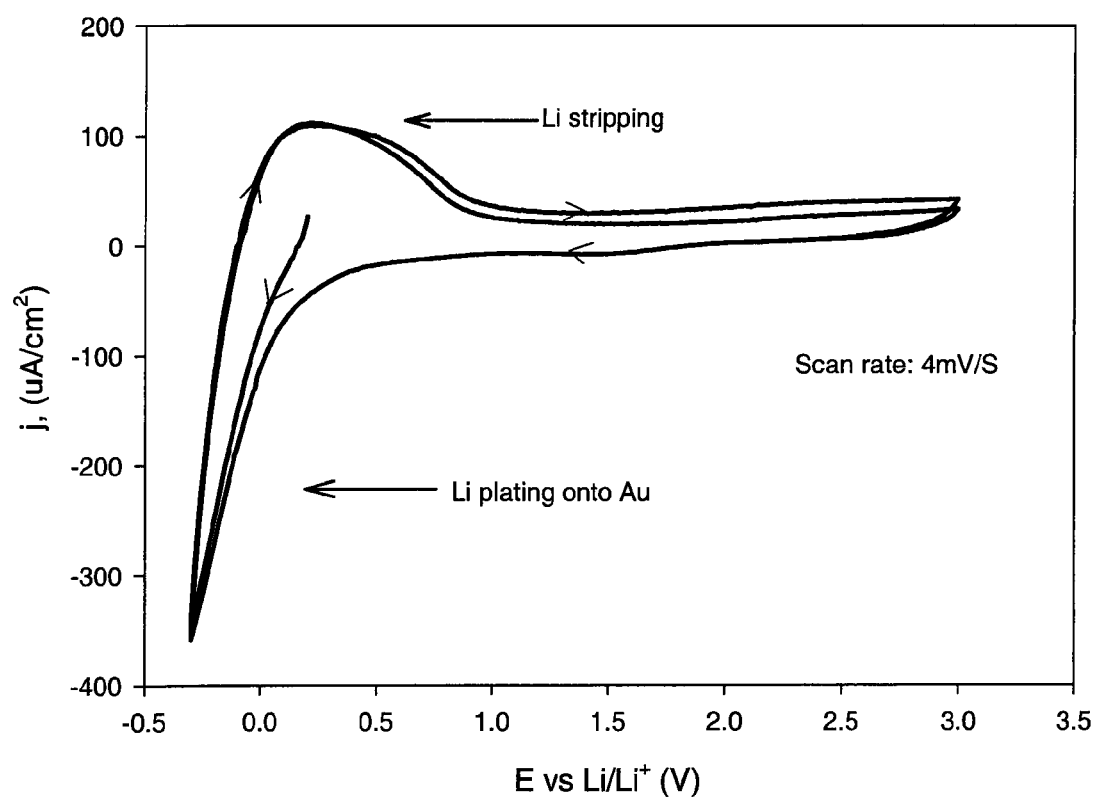

Impedance Measurements Using Glass-Ceramic Active Metal Ion Conductor (OHARA) in Composite Protective Layer Samples of $Li^+$ conductive glass-ceramic plates were received from OHARA Corporation. Approximately 3 to 7 microns of lithium was evaporated directly onto the OHARA glass-ceramic plate. The deleterious reaction of lithium with the electrolyte is seen in FIG. 8A; the impedance of the sample is quite large, approximately 40,000 $\Omega cm^2$. A film of $Cu_3N$ (about 0.9 microns thick) was RF Magnetron sputter-deposited onto a second sample of glass-ceramic plate, with subsequent evaporation of about 3 to 7 microns of lithium. The beneficial effect of the $Cu_3N$ film can be seen in FIG. 8B; the impedance of the glass-ceramic is dramatically improved relative to the plate without the $Cu_3N$ film. Superimposition of FIGS. 8A and 8B in FIG. 8C further illustrates the dramatic improvement in performance for the $Cu_3N$ protected plate. The ionically conductive nature of the protective film is seen in 8D, where lithium is moved across the Li/$Cu_3N$/glass interface; this is presumably due to conversion of the ionically insulating $Cu_3N$ film to highly conductive $Li_3N$+Cu.

CONCLUSION

Although the foregoing invention has been described in some detail for purposes of clarity of understanding, it will be apparent that certain changes and modifications may be practiced within the scope of the appended claims. It should be noted that there are many alternative ways of implementing both the process and compositions of the present invention. Accordingly, the present embodiments are to be considered as illustrative and not restrictive, and the invention is not to be limited to the details given herein.

All references cited herein are incorporated by reference for all purposes.

What is claimed is:

1. A battery cell, comprising:
    an anode and a lithium ion cathode comprising a lithium ion intercalation compound;
    wherein the anode is an electrochemical device component comprising:
    an active metal lithium electrode having a first surface and a second surface; and
    a composite protective membrane on the first surface of the electrode, the composite protective membrane being ionically conductive and chemically compatible with the active metal lithium on a side in contact with the active metal electrode, and substantially impervious, ionically conductive and chemically compatible with active metal lithium corrosive environments on the other side, the membrane comprising a substantially impervious sintered ceramic or glass-ceramic layer having a thickness between 10 and 1000 microns;
    wherein the ionic conductivity of the membrane is at least 10-7 S/cm;
    a current collector on the second surface of the active metal electrode; and
    wherein the device component can be handled or stored in normal ambient atmospheric conditions without degradation prior to incorporation into an electrochemical device.

2. The battery cell of claim 1, wherein the active metal electrode is lithium metal.

3. The battery cell of claim 1, wherein the active metal electrode comprises a lithium alloy.

4. The battery cell of claim 1, wherein ceramic is a sintered ceramic.

5. The battery cell of claim 1, wherein ceramic is a glass-ceramic.

6. The battery cell of claim 1, further comprising a liquid electrolyte disposed between and in contact with the cathode and the protective membrane.

7. The battery cell of claim 1, wherein the composite protective membrane further comprises a lithium ion conductive material interlayer in direct contact with the active lithium metal electrode and the substantially impervious layer, the interlayer chemically compatible with the impervious layer and the active lithium metal electrode.

8. The battery cell of claim 7, wherein the interlayer thickness is in the range of 0.1 to 5 microns.

9. The battery cell of claim 7, wherein the interlayer thickness is in the range of 0.2 to 1 micron.

10. The battery cell of claim 7, wherein the interlayer is a lithium ion conducting glass.

11. The battery cell of claim 7, wherein the interlayer comprises LiPON.

12. The battery cell of claim 7, wherein the interlayer is a layer of LiPON.

13. The battery cell of claim 7, wherein the interlayer comprises a material selected from the group consisting of lithium nitride, lithium phosphide, and lithium iodide.

14. The battery cell of claim 7, wherein the interlayer comprises a material selected from the group consisting of $Li_3N$, LI, and $Li_3P$.

15. The battery cell of claim 7, wherein the interlayer comprises the reaction product of a precursor material layer with lithium metal.

16. The battery cell of claim 15, wherein the precursor material is selected from the group consisting of copper nitride, tin nitride, zinc nitride, iron nitride, cobalt nitride, aluminum nitride and silicon nitride.

17. The battery cell of claim 15, wherein the precursor material comprises red phosphorous.

18. The battery cell of claim 15, wherein the precursor material comprises $I_2$.

19. The battery cell of claim 1, wherein the lithium ion intercalation cathode is a 4V cathode.

20. The battery cell of claim 1, wherein the lithium ion intercalation cathode is a 5V cathode.

21. The battery cell of claim 1, wherein the lithium ion intercalation compound is a metal oxide or a metal sulfide.

22. The battery cell of claim 1, wherein the lithium ion intercalation compound is a metal oxide.

23. The battery cell of claim 1, wherein the intercalation compound comprises a transition metal selected from the group consisting of Co, Ni, Mn, Fe, V, Mo, Cu, Ti and Cr.

24. The battery cell of claim 1 wherein the intercalation compound comprises a transition metal selected from the group consisting Co, Ni, Mn and Fe.

25. The battery cell of claim 1 wherein the intercalation compound is selected from the group consisting of $Li_xCoO_2$, $Li_xNiO_2$, $Li_xMn_2O_4$ and $LiFePO_4$.

26. The battery cell of claim 1 wherein the intercalation compound is unlithiated.

27. The battery cell of claim 1, further comprising a liquid electrolyte disposed between and in contact with the cathode and the protective membrane, and not in contact with the active lithium metal electrode.

28. The battery cell of claim 27, wherein the liquid electrolyte comprises a solvent selected from the group consisting of organic carbonate, ether, and ester.

29. The battery cell of claim 27, wherein the liquid electrolyte comprises at least one solvent or salt that is chemically incompatible with the active lithium metal electrode.

30. The battery cell of claim 29, wherein the liquid electrolyte comprises a the salt that is an ionic liquid.

31. The battery cell of claim 30, wherein the ionic liquid is selected from the group consisting of imidazolium, pyridinium, phosphonium and tetralkylammonium compounds.

32. The battery cell of claim 1, further comprising a gel electrolyte disposed between and in contact with the cathode and the protective membrane, and not in contact with the active lithium metal electrode.

33. The battery cell of claim 1, wherein the cathode lithium ion intercalation compound is a lithium metal oxide.

34. The battery cell of claim 1, wherein the cathode lithium ion intercalation compound is selected from the group consisting of lithium cobalt oxide, lithium nickel oxide, lithium manganese oxide and lithium iron phosphate.

35. The battery cell of claim 1, wherein the cathode lithium ion intercalation compound is unlithiated.

36. The battery cell of claim 35, wherein the cathode lithium ion intercalation compound is a metal oxide or a metal sulfide.

* * * * *